(12) United States Patent

Paulraj et al.

(10) Patent No.: US 12,670,047 B2

(45) Date of Patent: Jun. 30, 2026

(54) SYSTEM AND METHOD FOR MANAGING OPERATION OF DATA PROCESSING SYSTEMS TO MEET OPERATIONAL GOALS

(71) Applicant: Dell Products L.P., Round Rock, TX (US)

(72) Inventors: Deepaganesh Paulraj, Bangalore (IN); Min Gong, Shanghai (CN); Ashok Narayanan Potti, Bangalore (IN); Dale Wang, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 222 days.

(21) Appl. No.: 18/308,216

(22) Filed: Apr. 27, 2023

(65) Prior Publication Data

US 2024/0362097 A1 Oct. 31, 2024

(51) Int. Cl.
*G06F 11/00* (2006.01)
*G06N 5/04* (2023.01)

(52) U.S. Cl.
CPC .......... *G06F 11/008* (2013.01); *G06F 11/004* (2013.01); *G06N 5/04* (2013.01); *G06F 2201/86* (2013.01)

(58) Field of Classification Search
CPC .. G06F 11/008; G06F 11/004; G06F 2201/86; G06N 5/04
See application file for complete search history.

(56) References Cited

U.S. PATENT DOCUMENTS

| | | | |
|---|---|---|---|
| 8,538,897 | B2 | 9/2013 | Han et al. |
| 10,572,329 | B2 | 2/2020 | Harutyunyan et al. |
| 10,740,793 | B1 | 8/2020 | Sussman et al. |
| 10,776,196 | B2 | 9/2020 | Ohana et al. |
| 10,853,867 | B1 | 12/2020 | Bulusu et al. |

(Continued)

FOREIGN PATENT DOCUMENTS

| | | |
|---|---|---|
| CN | 108280168 A | 7/2018 |
| CN | 111476371 A | 7/2020 |

(Continued)

*Primary Examiner* — Ashish Thomas
*Assistant Examiner* — Indranil Chowdhury
(74) *Attorney, Agent, or Firm* — WOMBLE BOND DICKINSON (US) LLP

(57) ABSTRACT

Methods and systems for managing data processing systems are disclosed. A data processing system may include and depend on the operation of hardware and/or software components. To manage the operation of the data processing system, a data processing system manager may obtain logs for components of the data processing system. Inference models may be implemented to predict likely future component failures (e.g., failure sequences) and their associated times-to-failures using information recorded in the logs. The failure sequences may be presented as an acyclic graph that associates component failures, their times-to-failure, and related actions. The probable failure sequences may be analyzed to identify sets of actions. The sets of actions may be optimized based on deviations detected during executing the sets of actions to optimize operational goals (e.g., maximizing system lifetime, minimizing system costs), and/or reduce the likelihood of the data processing system becoming impaired.

20 Claims, 12 Drawing Sheets

(56) References Cited

U.S. PATENT DOCUMENTS

| | | | | |
|---|---|---|---|---|
| 10,860,297 | B2 * | 12/2020 | Gokhale | G06F 16/2465 |
| 11,461,163 | B1 | 10/2022 | Aggarwal | |
| 11,513,930 | B2 | 11/2022 | Chan et al. | |
| 11,514,347 | B2 | 11/2022 | Dinh | |
| 11,720,940 | B2 | 8/2023 | Lakshminarayan et al. | |
| 11,734,102 | B1 | 8/2023 | Wang et al. | |
| 11,803,440 | B2 * | 10/2023 | Harutyunyan | G06N 5/04 |
| 11,809,271 | B1 | 11/2023 | Wang | |
| 11,909,836 | B2 | 2/2024 | Wulf et al. | |
| 2009/0113248 | A1 * | 4/2009 | Bock | G06F 11/0748 |
| | | | | 714/39 |
| 2009/0171731 | A1 * | 7/2009 | Bobak | G06Q 10/06313 |
| | | | | 705/7.23 |
| 2009/0216910 | A1 * | 8/2009 | Duchesneau | F28D 15/06 |
| | | | | 709/250 |
| 2010/0257058 | A1 * | 10/2010 | Karidi | G06Q 30/02 |
| | | | | 705/26.1 |
| 2010/0318856 | A1 * | 12/2010 | Yoshida | G06F 11/3006 |
| | | | | 707/723 |
| 2013/0041748 | A1 | 2/2013 | Hsiao et al. | |
| 2013/0198240 | A1 | 8/2013 | Ameri-Yahia et al. | |
| 2015/0227838 | A1 | 8/2015 | Wang et al. | |
| 2015/0288557 | A1 * | 10/2015 | Gates | G06F 11/0709 |
| | | | | 714/37 |
| 2016/0012152 | A1 * | 1/2016 | Johnson | G06Q 10/00 |
| | | | | 707/798 |
| 2018/0246988 | A1 * | 8/2018 | Johnson | G06F 16/9024 |
| 2019/0095313 | A1 | 3/2019 | Xu et al. | |
| 2019/0129785 | A1 * | 5/2019 | Liu | H04L 41/069 |
| 2019/0303106 | A1 * | 10/2019 | Gokhale | G06F 16/258 |
| 2020/0014583 | A1 * | 1/2020 | Dang | H04L 41/5009 |
| 2020/0026590 | A1 | 1/2020 | Lopez et al. | |
| 2020/0372016 | A1 * | 11/2020 | Rogynskyy | G06Q 10/10 |
| 2021/0027205 | A1 | 1/2021 | Sevakula et al. | |
| 2021/0241141 | A1 | 8/2021 | Dugger et al. | |
| 2021/0241152 | A1 | 8/2021 | Fong | |
| 2022/0066906 | A1 * | 3/2022 | Kumar | G06F 11/302 |
| 2022/0100187 | A1 | 3/2022 | Isik et al. | |
| 2022/0283890 | A1 | 9/2022 | Chopra et al. | |
| 2022/0358005 | A1 | 11/2022 | Saha et al. | |
| 2022/0417078 | A1 | 12/2022 | Matsuo et al. | |
| 2023/0016199 | A1 * | 1/2023 | Jividen | G06N 20/00 |
| 2023/0095270 | A1 * | 3/2023 | Garapati | G06N 5/01 |
| | | | | 714/37 |
| 2024/0028955 | A1 | 1/2024 | Harutyunyan et al. | |
| 2024/0311224 | A1 * | 9/2024 | Paulraj | G06F 11/0751 |
| 2024/0330391 | A1 * | 10/2024 | Paulraj | H04L 67/535 |
| 2025/0047915 | A1 * | 2/2025 | Paulraj | H04N 21/23439 |

FOREIGN PATENT DOCUMENTS

| | | | | |
|---|---|---|---|---|
| CN | 112541806 | A | 3/2021 | |
| EP | 4235505 | A1 | 8/2023 | |
| WO | WO-2008131446 | A2 * | 10/2008 | F25D 17/02 |

* cited by examiner

Data Table 250

| Series of Actions (Log Segment) | Component ID | Component Lifetime |
|---|---|---|
| AAAAHAAHA | C1 | 10 |
| AAAAAHAAHA | C1 | 15 |
| HHAHAAAAHAAHA | C3 | 30 |
| AAAAHAAHA AHAHAHAAHA HHAHAAAHAAHA | C1, C2, C3 | 10, 30, 40 |
| AHAHAHAAHA AAAAAHAAHA | C2, C1 | 20, 15 |
| ⋮ | ⋮ | ⋮ |

FIG. 2D

SYSTEM AND METHOD FOR MANAGING OPERATION OF DATA PROCESSING SYSTEMS TO MEET OPERATIONAL GOALS

FIELD

Embodiments disclosed herein relate generally to device management. More particularly, embodiments disclosed herein relate to systems and methods to manage the operation of devices to meet operational goals

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 2D shows an example of failure information in accordance with an embodiment.

DETAILED DESCRIPTION

Figure 1:
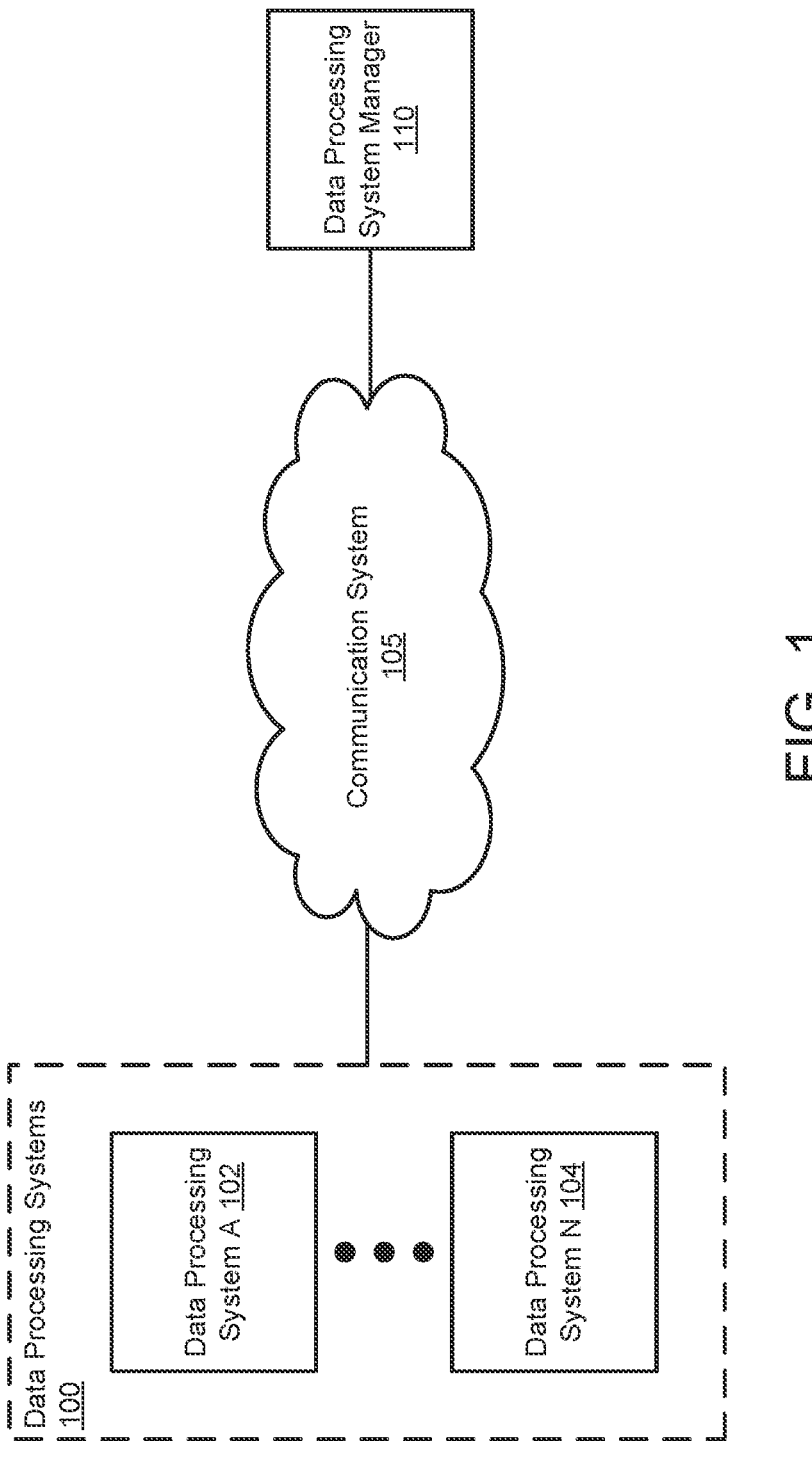
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems based on indications of a failure. A data processing system may include one or more hardware and/or software components. The operation of the data processing system may depend on the operation of these components. For example, improper operation of any of these components may impair (e.g., reduce performance, reduce functionality, etc.) the operation of the data processing system and/or contribute to a system failure.

To manage the operation of the data processing system, the system may include a data processing system manager. The data processing system manager may obtain log files for data processing systems reflecting the historical operation of these data processing systems. The historical log files may be used to predict the future operation of the data processing system (e.g., to predict the failure of a component that may result in a future undesired operation of the data processing system), and/or to provide other functions.

Log data may be analyzed using machine learning to obtain various types of inference models. The inference models may be used in sequence and/or conjunction to identify failure patterns (e.g., patterns that may lead to component failures) in large amounts of log data (e.g., ingest data). However, ingesting large amounts of log data (e.g., large log files) may be inefficient and may not result in timely failure detection.

Additionally, the identification of a future failure (e.g., of a single component) of the data processing system alone may not provide sufficient information for efficient and effective mitigation and/or prevention of the failure. The failure of a single component of the data processing system may subsequently impact the performance of other components of the data processing system, which may result in the failure of those components and/or the entire data processing system. Accordingly, sequences of future failures may be predicted based on log patterns from historical log files, up to and/or including full system failure.

To improve mitigation and/or prevention measures, additional failure information such as the time-to-failure may be predicted for each component within the failure sequence. The time-to-failure may be predicted using attribution score analysis (e.g., an inference model may be trained to assign attribution scores to log messages). Attribution scores may be used to identify portions of a log file (e.g., log segments) that contribute to the occurrence of a predicted future failure. The attribution scores may be analyzed to determine the time-to-failure for a predicted failure (e.g., using timestamp information recorded in the log file).

The failure sequences may be predicted using inference models. A trained inference model may analyze large volumes of log data to identify patterns in log messages that relate to a component failure, and/or subsequent component failures. The log segments may describe a series of actions (e.g., performed by a user), reactions (e.g., of the data processing system to the user actions), and/or health events (e.g., warnings).

The additional failure information may be presented using an acyclic graph (e.g., an acyclic failure graph) that may be analyzed to allow for proper assessment of the predicted failure sequences. The analysis may provide an overview of data processing system health and may allow for the identification of future actions that may be implemented (e.g., by the user) to achieve one or more operational goals (e.g., to remediate current failures and/or any other related system infrastructure issues that may be encountered in the future).

While implementing the future actions to achieve the one or more operational goals, one or more deviations between the expected results (e.g., expected data) and the actual results (e.g., actual data) of one or more actions within the future actions may be detected. The deviation(s) may be evaluated to determine whether current instances of the future actions need to be updated (e.g., whether a new set of future actions need to be determined/identified) in order for the one or more operational goals to still be achievable while also avoiding the need of using more resources (e.g., computing resources) than originally required to execute the current instances of the future actions. A new instance of the future actions may be generated based on the evaluation to ensure that the one or more operational goals to still be achieved as originally planned.

By doing so, an improved computing device and/or distributed system may be obtained. The improved device and/or system may have higher uptime and/or may be more resilient to impairment.

In an embodiment, a method for managing data processing systems is provided. The method may include obtaining actual data in response to configuring a manageable data processing system using an acyclic graph, wherein the manageable data processing system is one of the data processing systems; determining that a deviation exits between the actual data and expected data specified in the acyclic graph; determining, based on the deviation, a course of action associated with a configuring of the manageable data processing system, wherein the course of action is associated with achieving an operational goal of the manageable data processing system; and causing the manageable data processing system to execute the course of action.

The method may also include obtaining the acyclic graph based on historical failure information for the data processing systems, the acyclic graph comprising a plurality of nodes connected by a plurality of edges, the plurality of edges representing relationships between the plurality of nodes, and the relationships being probabilistically defined based on the historical failure information. Configuring the manageable data processing system may include identifying the operational goal for the manageable data processing system; analyzing the acyclic graph, based on the operational goal, to obtain an action set for the manageable data processing system; and initiating performance of the action set by the manageable data processing system, to increase a likelihood of meeting the operational goal.

The deviation may decrease the likelihood of meeting the operational goal by the manageable data processing system. Executing the course of action may prevent the decreases in the likelihood of meeting the operation goal by the manageable data processing system.

Obtaining the acyclic graph may include establishing a second node based on a failure of a second component type, the failure of the second component type occurring after a failure of a first component type, and the failure of the first component type being represented by a first node; establishing a first edge between the first node and the second node, the first edge being associated with a first relationship; establishing a third node based on a failure of a third component type, the failure of the third component type occurring after the failure of the second component type; and establishing a second edge between the second node and the third node, the second edge being associated with a second relationship.

Analyzing the acyclic graph may include enumerating traversal paths through the acyclic graph; for each traversal path of the enumerated traversal paths: obtaining an aggregate relationship based on the relationship of each of the edges along the traversal path, obtaining a fitness value based on the aggregate relationship and the operational goal, and obtaining a rank for the traversal path based on the fitness value, the rank being usable to order the traversal paths; selecting an initial best fit traversal path of the traversal paths based on the ranks of the traversal paths; and obtaining the action set based on the initial best fit traversal path.

The actual data may be obtained by the manageable data processing system in real-time as the manageable data processing system executes actions included in the action set.

The course of action may include generating, based on the deviation and the traversal paths of the acyclic graph, a new action set including new actions different from the actions included in the action set.

The new action set may be associated with a new best-fit traversal path among the traversal paths that is different from the initial best fit traversal path.

The course of action may include continuing to execute the actions of the action set.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a system in accordance with an embodiment is shown. The system shown in FIG. 1 may provide computer implemented services. The system may include data processing systems 100. Data processing systems 100 may include any number of computing devices that provide the computer implemented services. For example, data processing systems 100 may include one or more data processing systems 102, 104 that may independently and/or cooperatively provide the computer implemented services.

For example, all, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Different systems may provide similar and/or different computer implemented services.

To provide the computer implemented services, data processing systems 100 may host applications that provide these (and/or other) computer implemented services. The applications may be hosted by one or more of data processing systems 100.

Any of data processing systems 102-104, and components thereof, as well as hosted entities (e.g., applications that provide computer implemented services, other applications that manage the operation of data processing systems 100, etc.), may be subject to undesired operation. For example, due to various operating conditions, flaws in design, normal wear and tear (e.g., reaching the end-of-life of a hardware component), and/or for other reasons, any of these hardware and/or software components may operate in a manner that diverges from nominal (e.g., desired) operation.

The performance and/or lifetime of a hardware component of any of data processing systems 102-104 may be influenced by actions (e.g., of a user), and/or by failures of other components (e.g., subsequent failures in the component's failure sequence). For example, an action (or inaction) of a user may cause a component to fail at a faster rate than if different action(s) had been performed, resulting in a shorter component lifetime. These actions, reactions (e.g., to the actions), and any health events associated with the current status of the component and/or data processing system may be recorded and logged (e.g., by data processing systems 100).

When operating, any of these components may generate one or more logs. A log may be a data structure that includes operational information regarding data processing systems 100 such as, for example, descriptions of conditions encountered by a component (e.g., actions, reactions, and/or health events), a time when the condition was encountered, an identifier associated with a condition and/or generator of the log, an indication of a relative level of importance or severity of the encountered conditions, and/or other types of information.

While the logs may include information regarding the current operation of data processing systems 100, the logs may not specify whether portions of the log (e.g., log segments) are indicative of potential undesired operation of the data processing systems 100 and/or components thereof, and/or may lack other information that may be used to manage data processing systems 100. Rather, the logs may generally include a representation of current and/or past operation of all or a portion of data processing systems 100. Thus, the logs alone may not be useful for proactively addressing potential future undesirable operating conditions (e.g., component failures) of data processing systems 100, and/or causes of the potential undesired operation of data processing systems 100.

Additionally, it may not be clear how any particular portion of log information relates to likely future operation of the data processing systems due to the variety of different types of hardware components of data processing system 100, and variations in the operation of the hardware components.

In general, embodiments disclosed herein may provide systems, devices, and methods for managing data processing systems to reduce the likelihood of the data processing systems operating in an undesired manner. The data processing systems may be managed by identifying probable component failure sequences, associated times-to-failures of each of the components, and sequences from data processing system logs. Based on one or more operational goals (e.g., maximizing one or more times-to-failures, minimizing the cost of component repair or replacement, etc.), a series of actions may be identified and/or implemented that may be more likely to cause the data processing systems to meet the operation goals. While these operations are performed, deviations from the expected and actual operation of the data processing systems may be identified. The series of actions may be updated to address these deviations.

A system in accordance with an embodiment may include data processing system manager 110. Data processing system manager 110 may manage the operation of data processing systems 100.

To provide its functionality, data processing system manager 110 may (i) obtain logs for the hardware and/or software components of data processing systems 100, (ii) predict future failures based on the logs (e.g., using a trained inference model), (iii) utilize one or more trained inference models to predict a time-to-failure for the future failure of one or more components of one or more data processing systems, (iv) obtain an acyclic graph representing the predicted future failures (e.g., failure sequences) and associated times-to-failure, (v) analyze the acyclic graph to identify actions that may be implemented to increase the likelihood of achieving an operational goal, and/or (vi) initiate performance of one or more actions (e.g., an "action set") that may remediate potential undesirable operation and/or reduce the likelihood of data processing systems 100 operating in an undesirable manner in the future thereby improving the likelihood of meeting the operational goals. Refer to FIGS. 2A-3C for additional details regarding selection of action sets.

Figure 5:
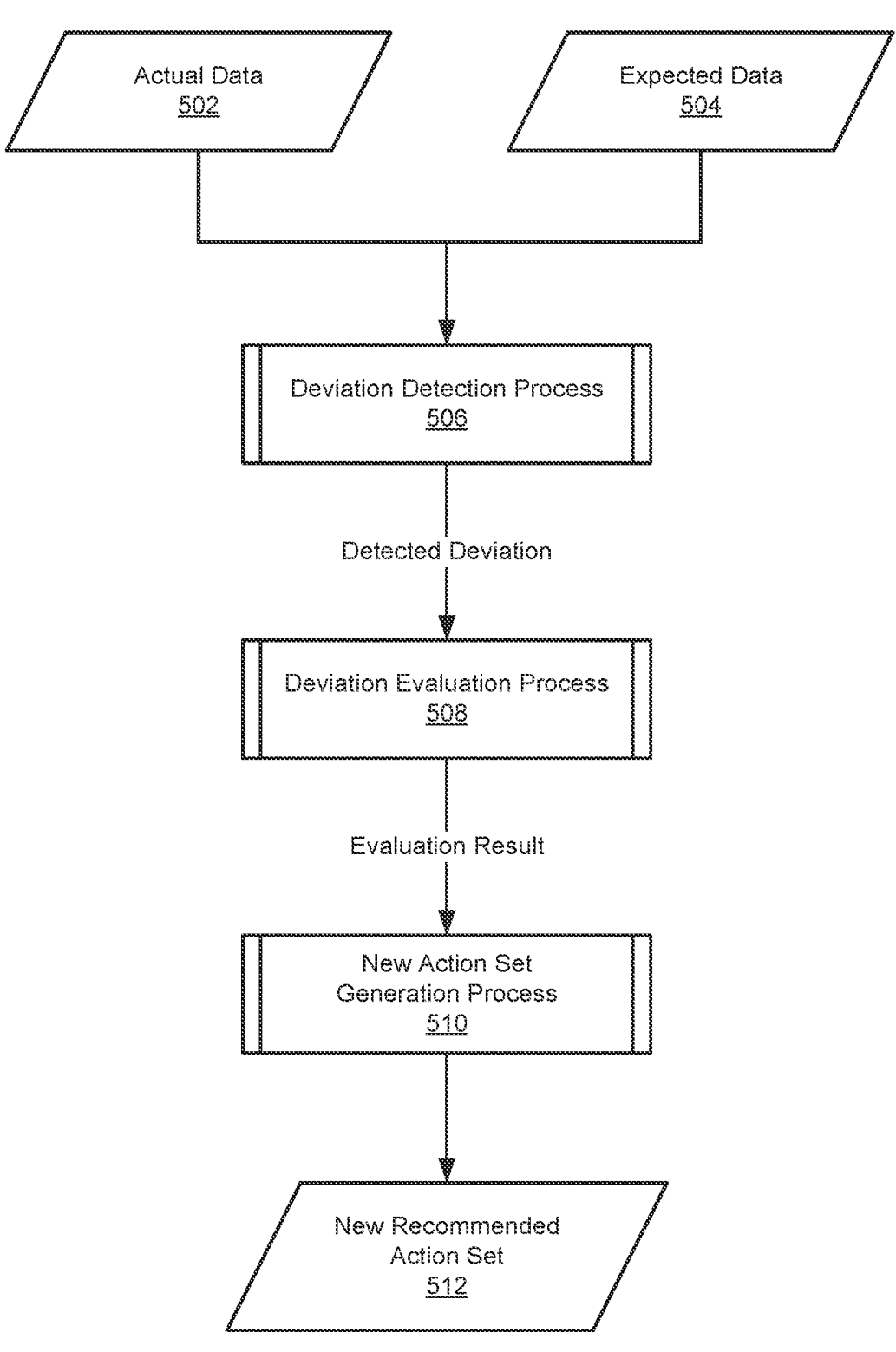
FIG. 5 shows a data flow diagram for a data processing system in accordance with an embodiment.

While the action set is performed, the actual operation of data processing systems 100 may be monitored to identify if it deviates from that expected based on the acyclic graph. If deviations are identified, the action set may be modified to manage the impact of the deviations. The deviations may also be used to revise the acyclic graph and/or other models used to select the actions. Refer to FIG. 5 for additional details regarding responding to deviations.

By doing so, a system in accordance with embodiments disclosed herein may provide data processing systems having, for example, (i) decreased downtime (e.g., downtime due to hardware failure), (ii) improved user experiences by avoiding phantom slowdowns and/or pauses (e.g., due to undesired operating behavior), (iii) lower cost of ownership and/or maintenance, (iv) improved lifetimes, and/or (v) improve computing resource availability for desired computer implemented services by reducing computing resource expenditures for management and/or remedial action.

Figure 4:
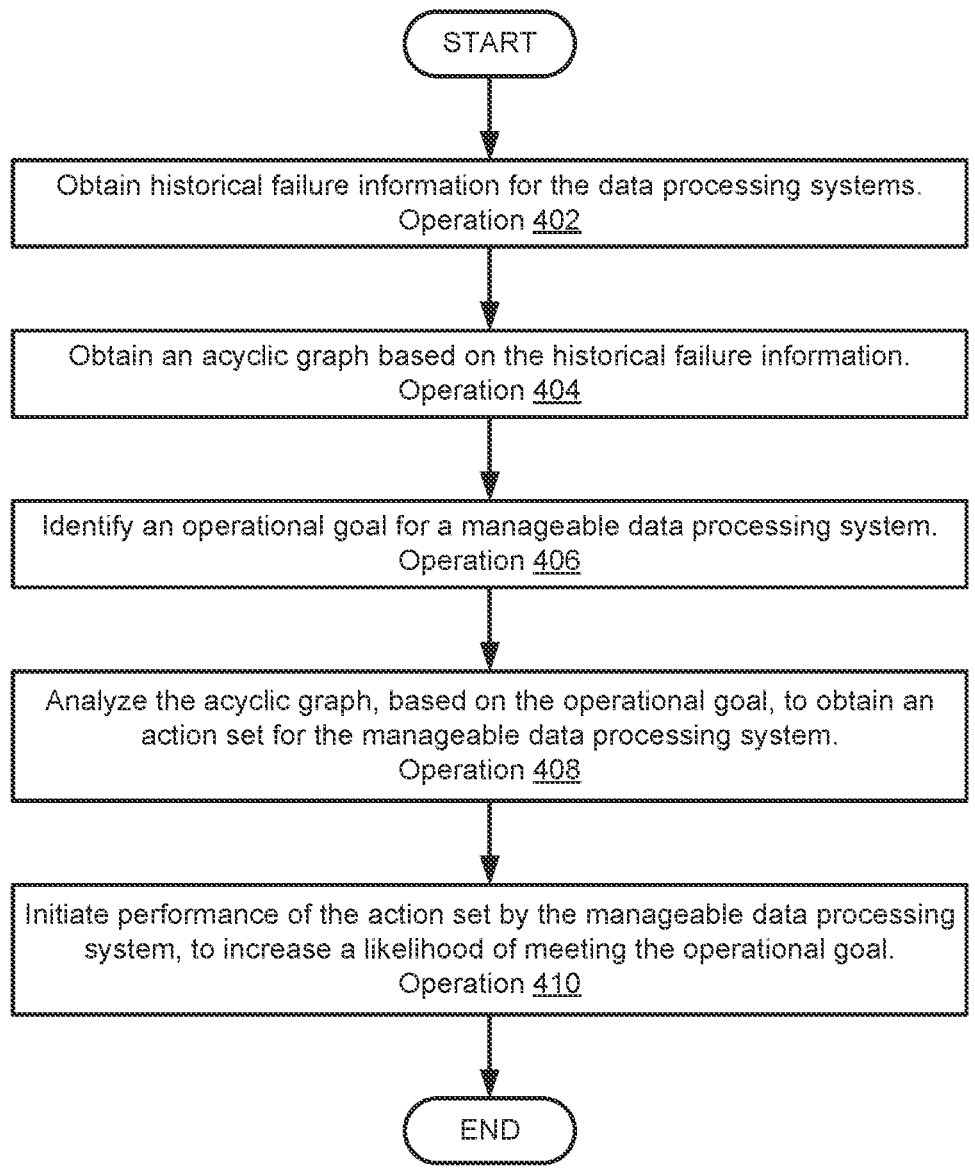
FIG. 4 shows a flow diagram illustrating a method of managing operation of a data processing system in accordance with an embodiment.
Figure 6:
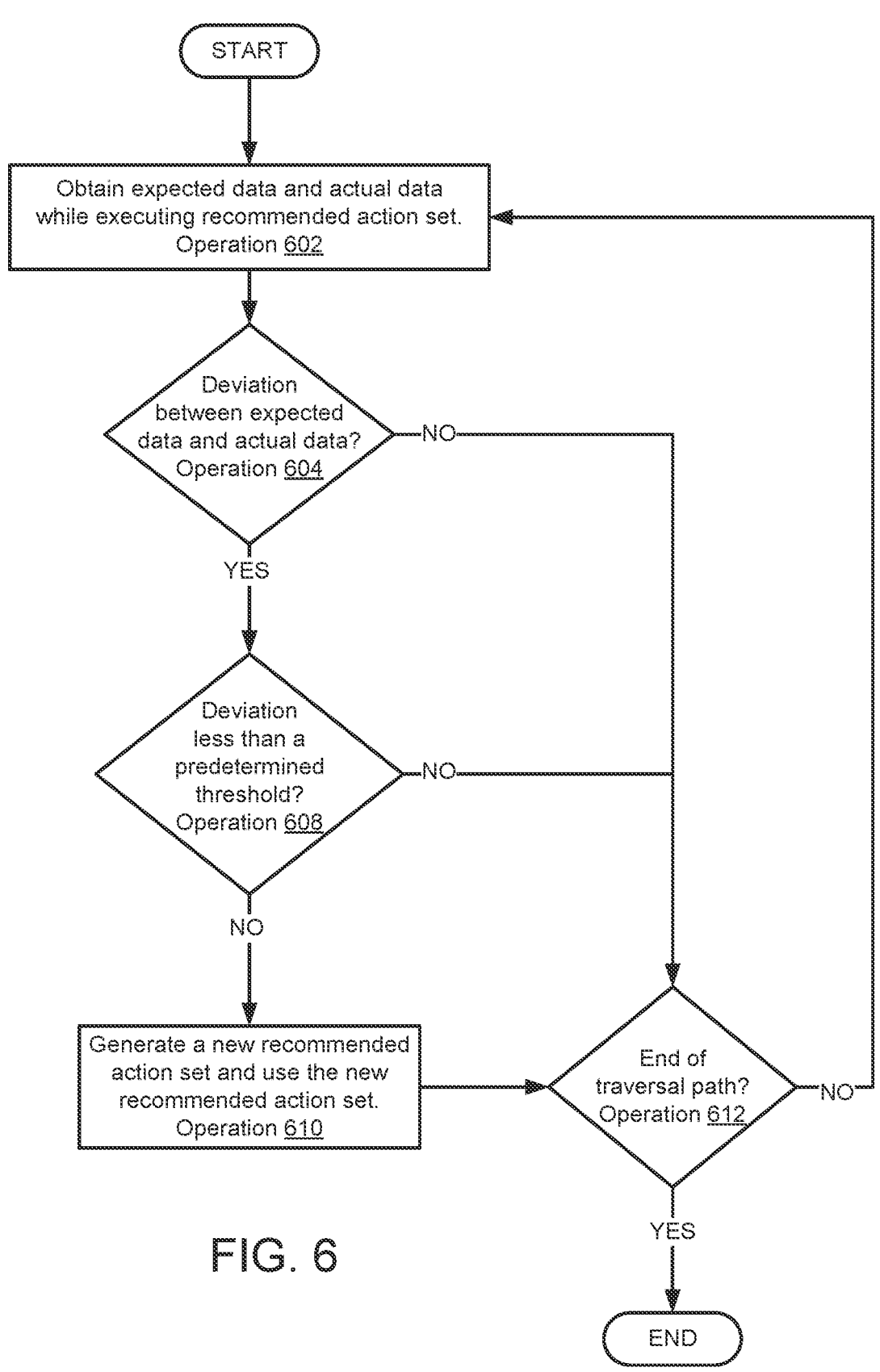
FIG. 6 shows a flow diagram illustrating a method in accordance with an embodiment.

When providing its functionality, data processing system manager 110 may perform all, or a portion, of the method and/or actions shown in FIGS. 4 and 6.

Data processing systems 100 and/or data processing system manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 7.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
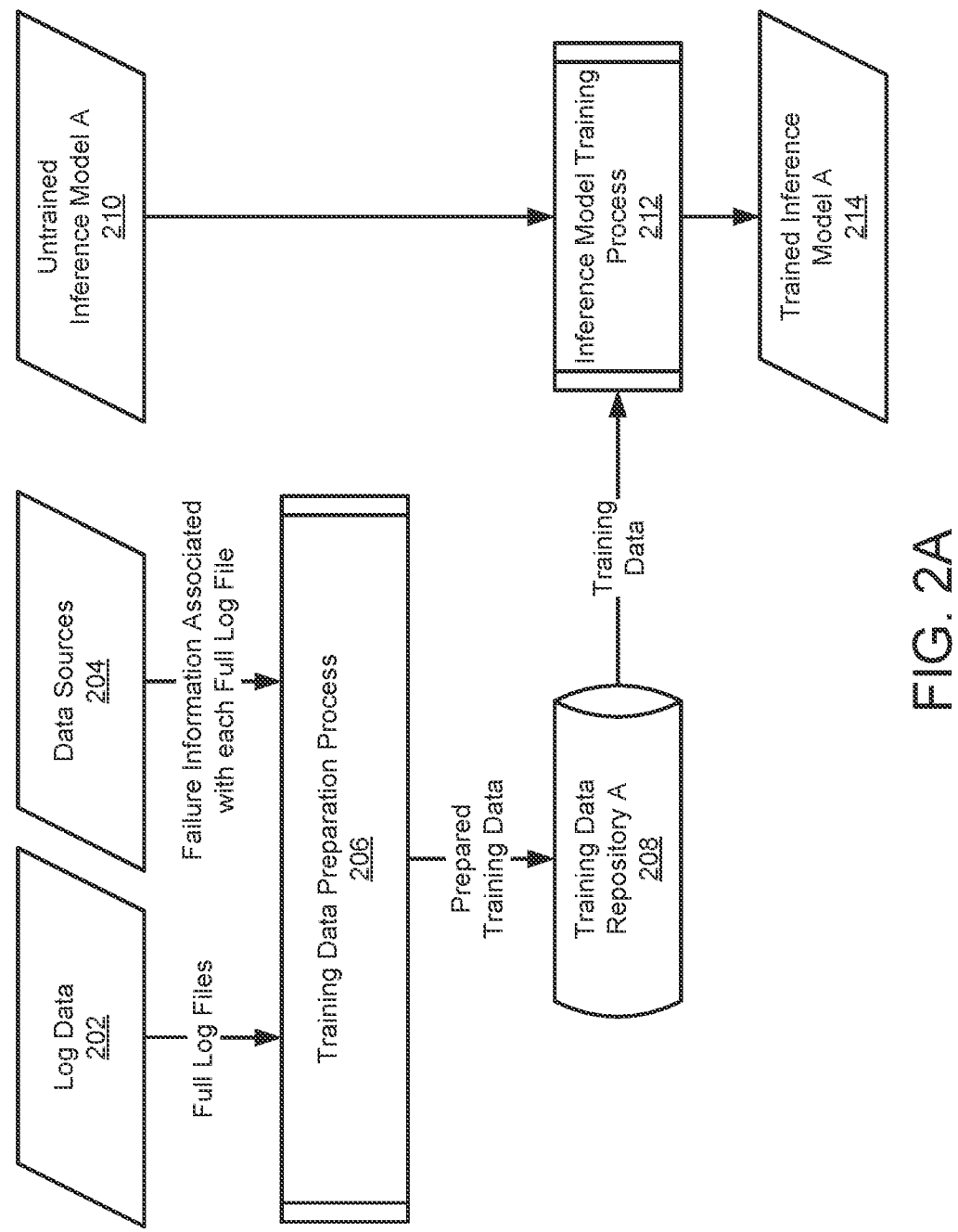
FIG. 2A shows a data flow diagram illustrating a process of obtaining a trained inference model in accordance with an embodiment.

Turning to FIG. 2A, a first data flow diagram in accordance with an embodiment is shown. The data flow diagram may illustrate the generation of inference models in a system similar to that of FIG. 1. The inference models may provide computer implemented services (e.g., inference generation) for downstream consumers. A data processing system may, over time, generate inference models for various purposes. For example, inference models may generate inferences that may be used to recognize patterns, automate tasks, and/or make decisions.

The inference models may, for example, be implemented with artificial neural networks, decision trees, support-vector machines, regression analysis, Bayesian networks, genetic algorithms, and/or any other type of model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a multi-layered neural network may process a large amount of complex data and generate highly accurate inferences, but may be costly to train and maintain and may have low explainability (e.g., may act as a "black box"). In contrast, a linear regression model may be a simpler, less costly inference model with high explainability, but may only be well-suited for data whose labels are linearly correlated with the selected features and may generate less accurate inferences than a neural network.

Once an inference model type is selected, the inference model must be trained using training data that may be acquired from various data sources (e.g., various data processing systems). FIG. 2A shows training data gathered from log data 202 and data sources 204. Log files from log data 202 and data from data sources 204 may be acquired from one or more data processing systems 100.

Log data 202 may be obtained from any number of data processing systems managed by data processing system manager 110. Log data 202 may include any type and quantity of logs, and may include descriptions of actions leading up to an event (e.g., a series of actions), and/or a description of an event (e.g., an undesirable operation and/or a normal operation). Log data 202 may be implemented with structured or unstructured data and may include any number of past logs (e.g., historical logs). These historical logs may relate to historical failure information collected from data sources 204.

Data sources 204 may include (i) systems and/or databases that store trouble tickets (e.g., helpdesk databases), (ii) a data processing system that hosts a component for which a past failure has occurred (e.g., the management controller of the data processing system), (iii) the supplier of a component for the data processing system (e.g., a manufacturer that has verified a faulty component), (iv) and/or other sources of failure information that may be associated with log data 202.

Training data preparation process 206 may collect training data such as full log files (e.g., historical log files) from log data 202, and/or failure information (e.g., types and/or times of past failures) from data sources 204. The full log files may include log patterns (e.g., series of actions) that may be related to past failures of data processing systems and/or components thereof, and the past failures may be associated with a time of failure.

Training data preparation process 206 may include verifying and/or performing data labeling (e.g., associating two or more data samples from the collected training data). For example, a full log file (e.g., input) may be associated with a past failure type (e.g., output). However, labeled training data may not always be reliable (e.g., a data sample may be improperly labeled by a user) and, if incorrectly labeled training data is used to train an inference model, the trained inference model may generate inaccurate inferences. Thus, the quality of training data labels may be verified as part of training data preparation process 206. For example, unreliable labels may be removed from a portion of training data and that portion of training data may be implemented as unlabeled data during training.

The prepared training data from training data preparation process 206 may be stored in training data repository A 208. Any of the training data from training data repository A 208 may relate log files from log data 202 to failure information from data sources 204, thereby including any portion of labeled data. Training data may also include unlabeled data and, thus, an association between log data 202 and data sources 204 may not be known.

Training data repository A 208 may include any number of training datasets. The training datasets may be used to train an inference model to generate a prediction (e.g., an inference) regarding a potential future failure of some component of the data processing system, based on ingested data (e.g., log data 202).

Untrained inference model A 210 may be trained using training data (e.g., from training data repository A 208). To do so, untrained inference model A 210 and the training data may be input to inference model training process 212.

Inference model training process 212 may employ machine-learning techniques such as supervised learning (e.g., for labeled training data), and/or unsupervised learning (e.g., for unlabeled data) to produce any number of trained inference models, including trained inference model A 214. The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained using inference model training process 212.

Trained inference model A 214 may attempt to map an input dataset to a desired output dataset (e.g., generate inferences). The inferences may be generated from ingest data that may differ from the training data that was used to train trained inference model A 214. For example, trained inference model A 214 may be used to analyze new logs (e.g., real-time logs) from a data processing system and may detect a future failure recorded in the new logs.

For example, trained inference model A 214 may be a classification inference model and may classify log files from log data 202 based on whether the log indicates a failure may occur and/or by failure type (e.g., failure classification). The failure type may indicate a component (e.g., a hardware component) of the data processing that may be subject to a future failure (e.g., is predicted to fail based on the log file).

Over time, the trained inference models may need to be updated for a variety of reasons. For example, the trained inference models may become inaccurate, may not provide desired types of inferences, etc. Consequently, trained inference models (e.g., trained inference model A 214) may be periodically replaced and/or updated.

Thus, as illustrated in FIG. 2A, the system of FIG. 1 may obtain and/or train inference models used for the detection of future failures based on log data of the data processing system. However, the detection of future failures alone may not be sufficient to determine effective solutions to manage component failures, especially in more complex cases (e.g., where multiple component failures are predicted and/or when predicted failures may be directly related). Thus, further analysis of relationships between log files and failure information may be performed to predict additional failure information such as time-to-failure.

Figure 2B:
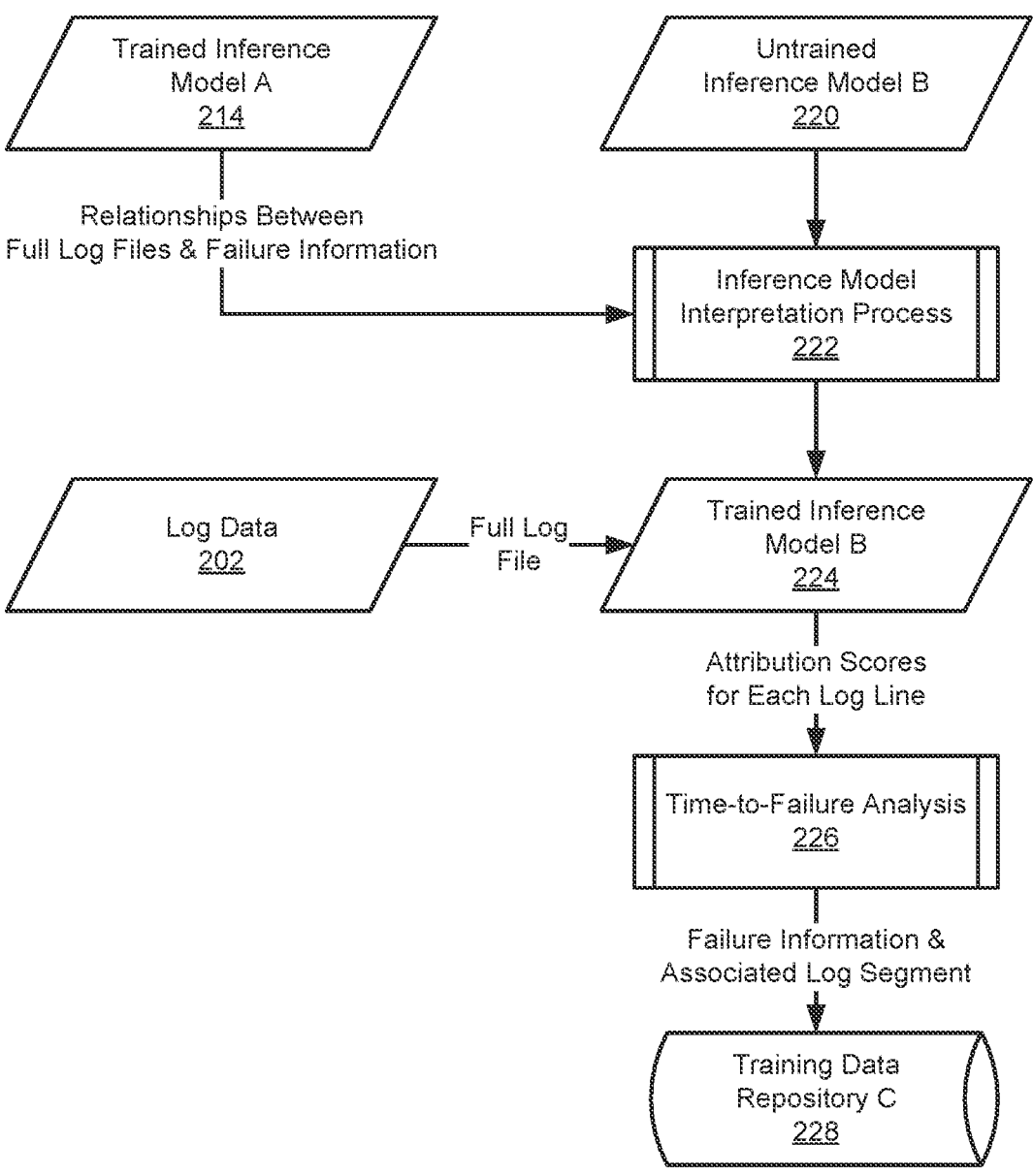
FIG. 2B shows a data flow diagram illustrating a process of obtaining a time-to-failure of a data processing system in accordance with an embodiment.

Turning to FIG. 2B, a second data flow diagram in accordance with an embodiment is shown. The data flow diagram illustrates a process of obtaining a time-to-failure of a data processing system. As previously mentioned, the time-to-failure for a predicted failure may be determined through analysis of attribution scores of log lines (e.g., of a log file) that may contribute to a predicted failure.

To obtain attribution scores, trained inference model A 214 may be interpreted using an interpretation framework during model interpretation process 222. Relationships between full log files and failure types (e.g., defined by the architecture and parameters of trained inference model A 214) may be interpreted using an inference model interpretation framework. The inference model interpretation framework may perform local feature attribution using various methods (e.g., SHAP, Grad-CAM, etc.). The feature attribution method may output the relevance (e.g., contribution) of each input feature of the inference model to an output feature (e.g., an inference generated by the inference model).

For example, local feature attribution performed on trained inference model A 214 may output an attribution score for every line of a full log file for any number of predicted failures. The attribution scores may be used to identify the portions of the log file that most impact the classification score (e.g., failure type) predicted by trained inference model A 214. A positive attribution score may indicate the amount that the log line contributes to the failure type), and a zero attribution score may indicate that the log line may have no contribution to the failure type.

As part of model interpretation process 222, untrained inference model B 220 may be trained using training data generated from model interpretation process 222 (e.g., training data that relates log lines and attribution scores for one or more failure types). Untrained inference model B 220 may be trained using a training method similar to the one described in FIG. 2A. Once trained, trained inference model B 224 may assign attribution scores to each log line of an ingested full log file obtained from log data 202. Any number of trained inference models may be generated using model interpretation process 222.

The attribution scores (e.g., for each failure type) for each log line may be input to time-to-failure analysis 226. Time-to-failure analysis 226 may perform a statistical analysis (e.g., computations of sums, standard-deviations, medians, and/or means) of the attribution scores for each log line of the full log file to identify log segments (e.g., smaller portions of the full log file) that contribute to one or more predicted failure types.

Some log lines of the log file may contribute to a predicted failure more than other log lines; therefore, to determine which portions of the log file contribute to a potential failure (e.g., and to predict which future failure is most likely), aggregate attribution scores may be derived. The aggregate attribution scores may be used to define a log segment (e.g., portion of the full log file) associated with a failure type. The defined log segment may include a pattern within the log file that relates to the occurrence of a predicted failure. In other words, the log segment may include a series of actions leading up to (e.g., causing) the predicted failure.

For example, a cumulative sum of attribution scores may be determined for each consecutive log line of the full log file for each failure type. The cumulative sum may represent the temperature of each log line (e.g., a heat map), denoting which log lines in the log file contribute to a predicted failure type. Log lines that have lower temperature values (e.g., lower cumulative attribution scores) may not contribute significantly to a future failure (e.g., may not indicate a future failure), whereas log lines that have higher temperature values may contribute significantly to the future failure. Log segments (e.g., groups of log lines) with higher temperatures (e.g., strong indications of a future failure) may be defined using virtual markers.

Virtual markers may be placed within a log file based on multiple attribution thresholds (e.g., defined by a user and/or based on statistical analysis). The virtual markers may be positioned throughout the full log file. For example, a first virtual marker may be positioned at the first log line in the log file that has a temperature exceeding a minimum threshold, the first virtual marker indicating the beginning of a log segment. A second virtual marker may be positioned at a log line in the full log file (e.g., subsequent to the position of the first virtual marker) based on a time of failure (e.g., the time at which the predicted failure occurred). The time of failure may be supplied by data sources 204 (refer to FIG. 2A) as part of the failure information associated with the failure type. The second virtual marker may be positioned at a log line that has a timestamp that matches and/or is nearest the supplied time of failure.

A third virtual marker may be positioned between the first and second virtual markers. The third virtual marker may be positioned based on a threshold that may be determined based on a maximum aggregate score for the log file (e.g., a total cumulative sum of scores of every log line of the log segment). For example, a third virtual marker may be positioned at the first log line of the log segment that has a temperature exceeding a maximum threshold (e.g., 75% of the total cumulative sum for the segment). Any number of virtual markers may be placed within the log segment to define a portion of the log (e.g., the log segment) and any sub-portions thereof. For example, the third virtual marker may indicate an end of the log segment (e.g., when used for predicting future failures), and/or the second virtual marker may indicate an end of the log segment (e.g., when used to determine the time-to-failure).

Time-to-failure analysis 226 may determine a time-to-failure based on one or more virtual markers positioned within the full log file. For example, the time-to-failure may be calculated by subtracting the timestamp value at the third virtual marker from the timestamp value at the second virtual marker (e.g., the time of failure). The failure type, time-to-failure, and/or the associated log segment (e.g., defined by the first and third virtual markers) may be stored in training data repository C 228. The training data stored in training data repository C 228 may be used to train an inference model that predicts failure information (e.g., failure type and/or time-to-failure) based on ingested log segments.

Thus, as illustrated in FIG. 2B, the system of FIG. 1 may obtain and/or train an inference model that may generate attribution scores for log lines of ingested full log files. The attribution scores may be used to position virtual markers in a log file that may be used to (i) determine a time-to-failure for a failure type (e.g., component type), and/or (ii) define a series of actions relating to (e.g., influencing and/or causing) the failure. The system of FIG. 1 may also generate and/or obtain the attribution scores to determine the time-to-failure for a future failure.

Figure 2C:
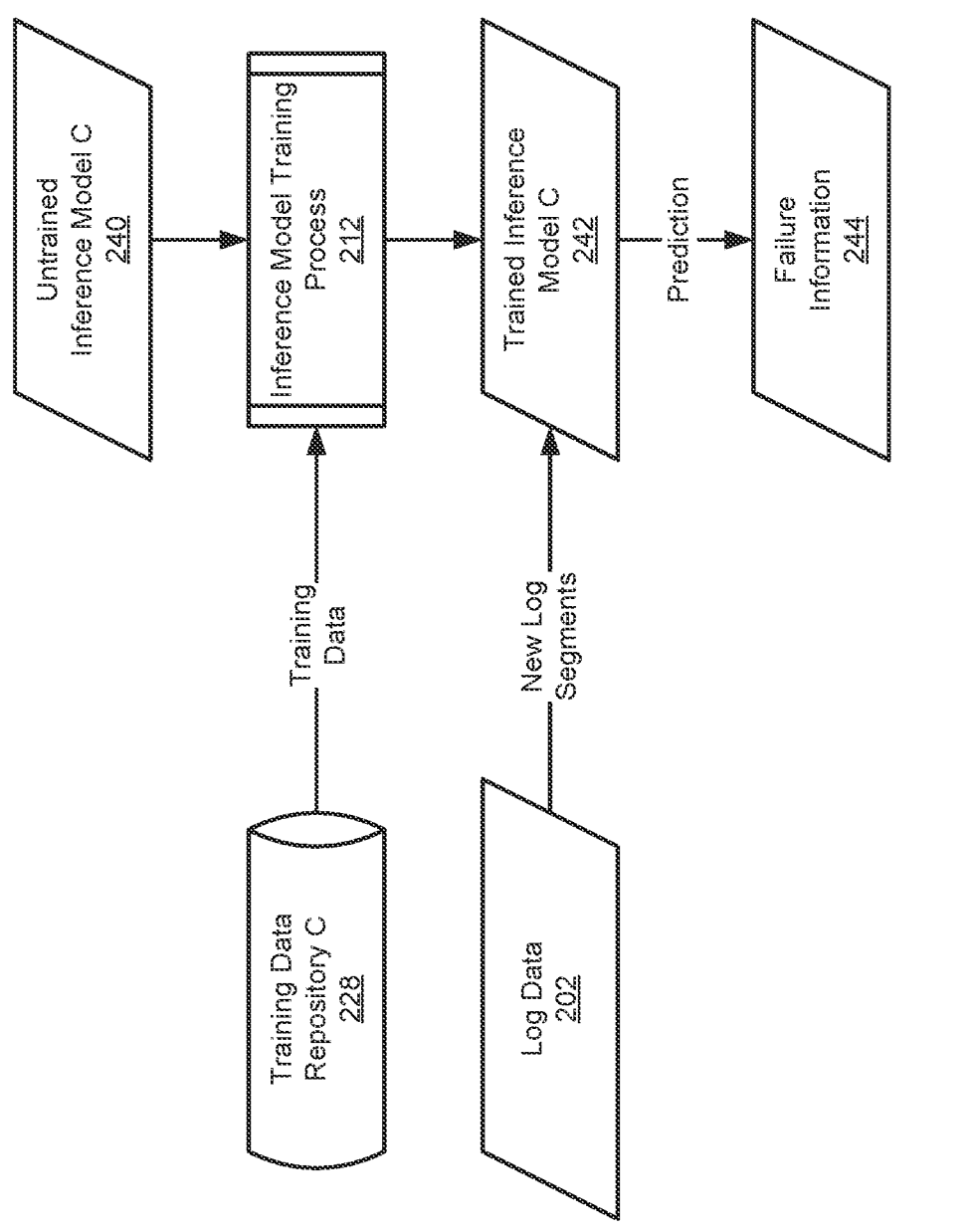
FIG. 2C shows a data flow diagram illustrating a process of determining failure information for a data processing system in accordance with an embodiment.

Turning to FIG. 2C, a third data flow diagram in accordance with an embodiment is shown. The data flow diagram illustrates a process of determining failure information for a data processing system in accordance with an embodiment. To predict failure information, an inference model may be trained using relational data stored in training data repository C 228.

Untrained inference model C 240 may undergo inference model training process 212 using training data from training data repository 228 C. The training process may be similar to the training process described with respect to FIG. 2A. The training data may relate log segments (e.g., portions of full log files and/or a series of actions) to a future failure type and/or time-to-failure. Trained inference model C 242 may be trained to predict failure information from ingest data (e.g., log segments).

For example, trained inference model C 242 may be a regression inference model and may predict a future failure type and the time-to-failure based on an ingested log segment. The log segment may be a portion of a full log file, and the portion may be defined by the placement of two virtual markers (as described with respect to FIG. 2B). Trained inference model C 242 may generate predictions based on ingestion of a new log segment from log data 202. The new log segment may be log data that is not included in training data used to train trained inference model C 242. The predictions (e.g., inferences) obtained from trained inference model C 242 may be reported (e.g., to a system administrator) as failure information 244.

Failure information 244 may include (i) a predicted failure of a component (e.g., information regarding the component type and/or the component identifier), (ii) a time-to-failure for the predicted failure, (iii) a series of actions relating to (e.g., a portion of the log segment ingested by the trained inference model used to generated the predicted failure) the predicted failure, and/or (iv) a health risk score of the data processing system that generated the log data (e.g., log segment).

New log segments obtained from log data 202 may be portions of log files (e.g., real-time log files). For example, a log segment may be a 5-minute segment of a full log file that may be days or weeks long. The log segments may be more efficiently ingested (e.g., read in parallel) and analyzed by trained inference model C 242 than a full log file. This increase in efficiency may result in an effective and efficient method of predicting failure type and/or time-to-failure based on a series of actions in a log file, allowing for improved methods for managing future failures and monitoring data processing system health.

Data processing system health may be monitored using cumulative health scores. The health scores may be based on attribution scores determined from input logs, the attribution scores having been determined for each component (e.g., possible failure type) of the data processing systems. An aggregation function (e.g., straight sum, mean, and/or weighted sum) may be used to derive a cumulative health score. For example, attribution scores for multiple failure types may be aggregated using a weighted sum that weights integral components of a data processing system more than secondary components. The weighted sum may be normalized based on minimum and maximum attribution scores for any and/or all components. The health score of the data processing system may be used as a global indicator of the level of risk of failure of one or more data processing systems.

The components of FIG. 1 may perform methods to generate failure information for data processing systems by detecting future failures, determining associated times-to-failures, and determining health scores based on short log segments from the data processing systems that provide computer implemented services.

Turning to FIG. 2D, an example of failure information in accordance with an embodiment is shown. Data table 250 shows five examples (e.g., each row showing unique data entries) of failure information 244 that may be generated using trained inference model C 242 (as described with respect to FIG. 2C). Each of the rows of data table 250 show a unique data entry (e.g., a row) for a series of actions relating to failed components and the component's lifetime (e.g. time-to-failure). The component identifier (ID) may indicate the type of failure (e.g., the predicted failure) and the component lifetime (e.g., predicted component lifetime) may be determined using the predicted time-to-failure associated with the component ID, and/or other information describing the failed component.

For example, to determine the component lifetime, the time-to-failure may be added to a date provided by the manufacturer of the component (e.g., the manufacture date and/or ship date of the component). As shown in data table 250, failure information 244 may include multiple component failures (e.g., ordered specifically to form a failure sequence). Each component failure may be associated with a set of actions and/or component lifetime value (e.g., depicted in rows 4 and 5). Moreover, failure information 244 may include multiple failure instances of the same component type (e.g., based on the operation of different data processing systems), each with varying associated series of actions and/or component lifetime values, (e.g., depicted in rows 1 and 2). Due to multiple same component failures and/or same component failure sequences, failure information 244 may undergo additional processing steps such as data consolidation and/or aggregation (as will be described in further detail with respect to FIG. 3A).

Data table 250 (e.g., failure information 244) may include any number of data entries. The data entries may include any number of actions (e.g., series of actions) and/or any length of failure sequence (e.g., number of components per failure sequence). It will be appreciated that the example shown in FIG. 2D is simplified for the sake of clarity and that a larger number of complex data entries may be encountered in practice.

The components of FIG. 1 may perform methods to collect failure information as a collection of data entries as shown in data table 250 of FIG. 2D. The failure information collected and/or stored by one or more data processing systems may be generalized as part of an acyclic failure graph generation process.

Figure 3A:
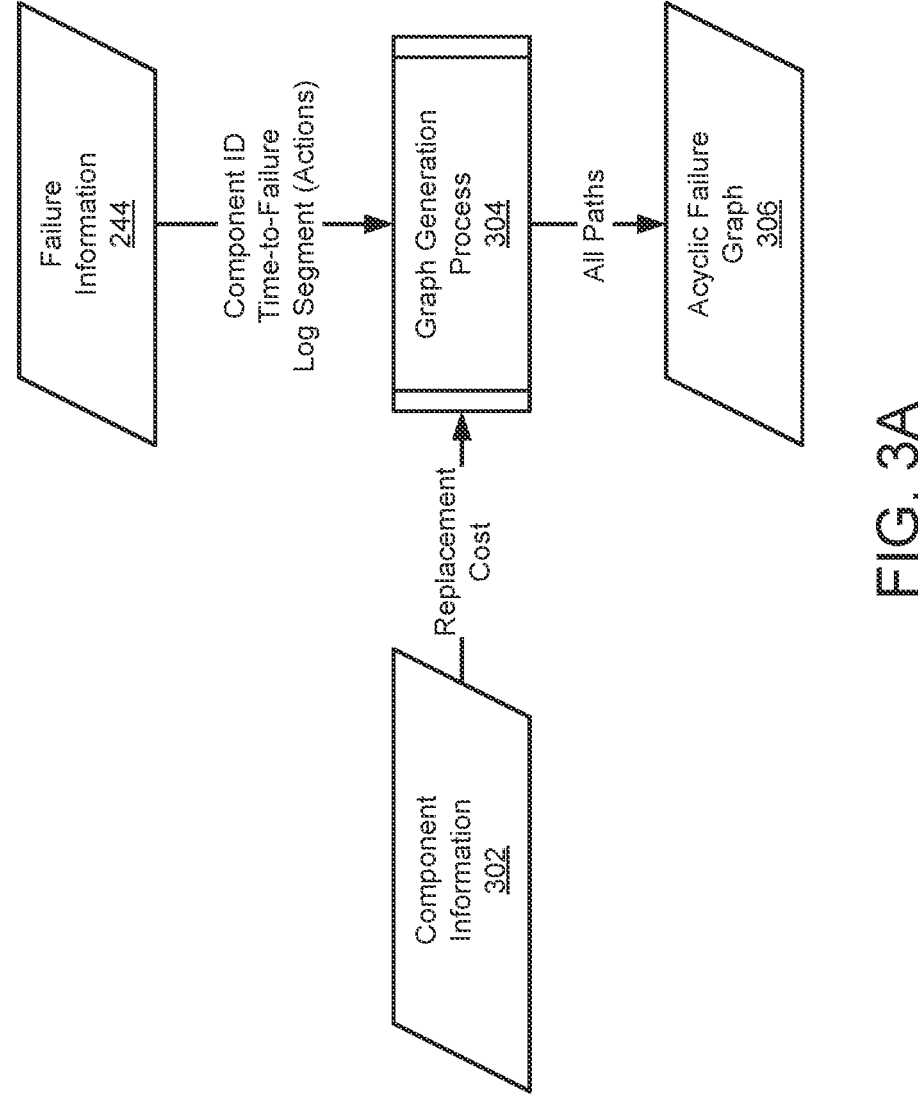
FIG. 3A shows a data flow diagram illustrating a process of generating an acyclic failure graph in accordance with an embodiment.

Turning to FIG. 3A, a fourth data flow diagram in accordance with an embodiment is shown. The data flow diagram illustrates a process of generating an acyclic failure graph using failure information. To generate the acyclic failure graph, failure information 244 and component information may be input to graph generation process 304.

As described with respect to FIGS. 2C-2D, failure information 244 may include a failure component ID, a time-to-failure (e.g., component lifetime) associated with the failure, and a log segment (e.g., series of actions) associated with the component failure. Component information 302 may include general information regarding the failed component such as replacement and/or repair costs, manufacturer date, ship date, and/or installation date.

Graph generation process 304 may include preparing (e.g., processing) failure information 244, in order to be represented as an acyclic graph. The preparation of failure information 244 may include the consolidation of multiple similar or same data entries (e.g., as described with respect to FIG. 2D). The data consolidation process may employ methods of statistical analysis (e.g., computations of sums, standard-deviations, medians, and/or means).

For example, data entries with the same component failure ID that have a similar (e.g., within a prescribed threshold) series of actions may be consolidated by generalizing the series of actions (e.g., using on the mode of the series of actions). Similarly, for data entries with same sequences of component failure IDs and similar series of actions (e.g., same generalized series of actions), the associated times-to-failures may be consolidated (e.g., using some statistical method of averaging) to generate a mean time-to-failure (MTTF).

The consolidated failure information (e.g., generalized series of actions, MTTF, and/or component ID) may be used to generate acyclic failure graph 306. For example, from a starting point (e.g., a current operating status of a data processing system), a series of connected nodes may be established for a failure sequence, with each node representing a component ID of the failure sequence of the data processing system. The series of nodes may be connected in a specific order (e.g., the order of the failure sequence) by edges. That is, the nodes may be connected to reflect the order of component ID failures. The failure sequence may terminate at an end point (e.g., the point at which the data processing system may fail).

The edges used to connect the nodes may denote relationships between the nodes (e.g., the failed component IDs). That is, a first component may fail prior to a second component, and the edge that connects their representative nodes may indicate one or more relationships between them. The relationships may include (i) a duration of time (e.g., MTTF) between the failure of the first component and the failure of the second component, (ii) a generalized series of actions that occurred between the time of the failure of the first component and the time of failure of the second component, (iii) a cost associated with the repair and/or replacement of the second component, and/or (iv) any other relationships that may be established between the two components.

The nodes and edges may be established for any number of failure sequences, as determined by the input (e.g., consolidated failure information) to generate and/or obtain acyclic failure graph 306.

Figure 3B:
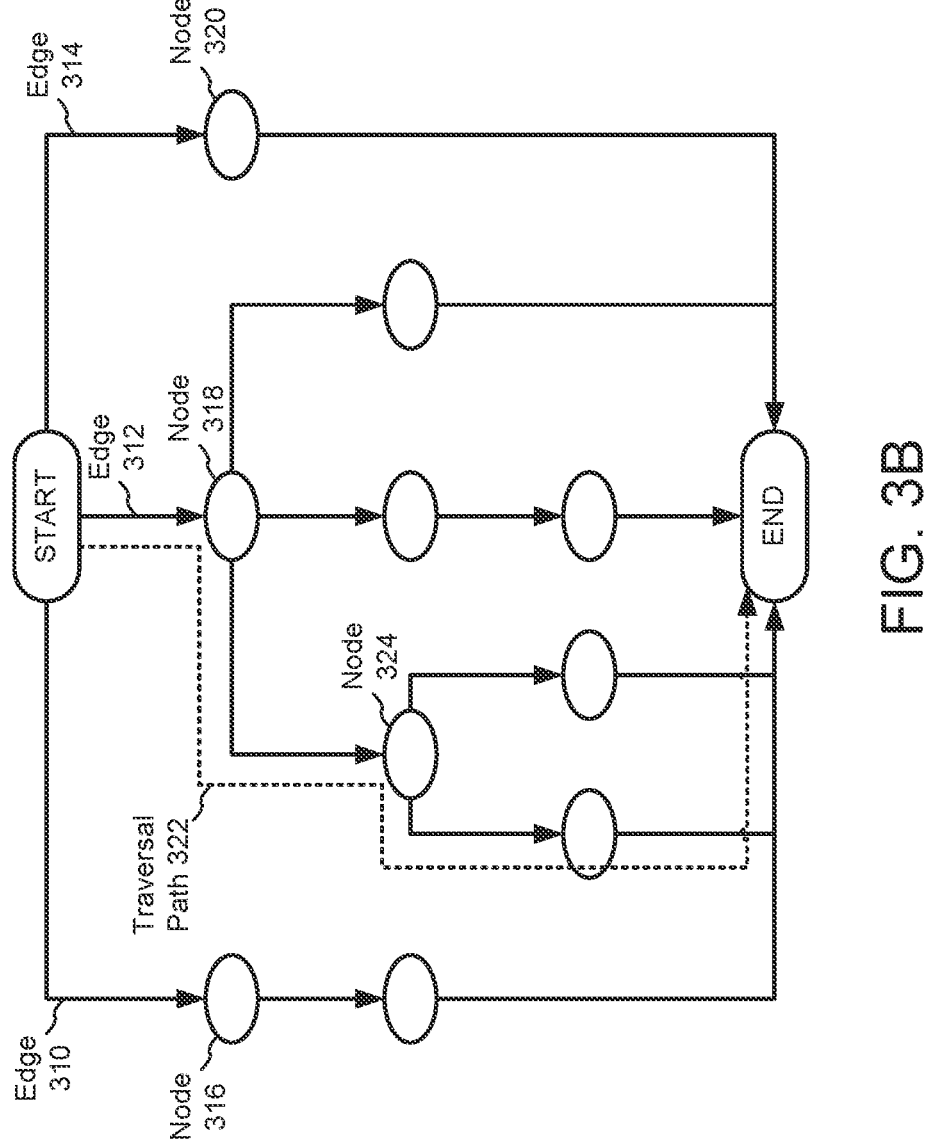
FIG. 3B shows an example of an acyclic graph in accordance with an embodiment.

Turning to FIG. 3B, an example of an acyclic graph in accordance with an embodiment is shown. The acyclic graph (e.g., of one or more data processing systems) shown in FIG. 3B may include nodes (e.g., nodes 316, 318, 320, and 324) and edges (e.g., edges 310, 312, 314) connecting corresponding nodes.

A progression through the acyclic graph may be referred to as a traversal path (e.g., stepping through the acyclic graph by visiting a series of connected nodes). The traversal path may begin at a source position (e.g., source node) and end at a destination position (e.g., destination node). For example, traversal path 322 begins at a "START" position of the acyclic graph and terminates at an "END" position of the acyclic graph.

For example, the source position may be a node and/or may be based on the current status of the data processing system (e.g., no components have failed, one component has failed, a particular series of components have failed, etc.). The end position ("END") may denote full system failure. The progression through the acyclic graph (e.g., from START to END) may be referred to as a traversal path.

The edges connecting a first node and a second node may represent: (i) the likely series of actions, health events, etc. that is likely to lead to the outcome associated with the second node (e.g., a component failure) following the outcome associated with the first node (e.g., a different component failure), (ii) the duration of time between when the outcome associated with the first node and the outcome associated with the second node are likely to occur, and/or (iii) other types of information regarding what is likely to occur if the likely series of actions, health events, etc. is performed after the outcome associated with the first node. The information associated with an edge may be denoted as one or more relationships (e.g., a set of relationships) between the two nodes. The relationships may be obtained from consolidated failure information (as described with respect to FIG. 3A).

The relationships may be used to ascertain how the performance of different series of actions, health events, etc. are likely to impact the operation of a data processing system. For example, the edges may represent a generalized series of actions (e.g., that may be performed by a data processing system). Thus, from the START position in FIG. 3B, if a user initiates performance of the generalized series of actions associated with edge 312, node 318 may be visited, defining the first step of a traversal path. However, if the user initiates performance of the generalized series of actions associated with edge 310 or edge 314, the first step of the traversal path may be to node 316 or node 320, respectively.

In the example of an acyclic failure graph, the edges (e.g., sets of relationships) may indicate characteristics (e.g., likely time to failure) regarding the process of failures of various components of the data processing system. For example, traversal path 322 begins at the START position which may be associated with the current status of the components of the data processing system (e.g., no component failures have occurred). The user may initiate performance a first series of actions associated with edge 312 to define the first step of traversal path 322 (e.g., to node 318, which may represent a first component failure). Next, the user may initiate performance of a second series of actions associated with the edge connecting node 324, representing a second component failure.

The set of relationships represented by edges of an acyclic failure graph may also include a MTTF and/or a cost value (e.g., of component maintenance). For example, from the START position, if the user performs the generalized series of actions associated with edge 312, the MTTF may indicate the time-to-failure of the component represented by node 318. If the component represented by node 318 fails, the cost value may indicate the price to repair and/or replace the component may be incurred.

The entirety of traversal path 322 may represent the likely outcome of a data processing system if a user initiates performance of the multiple series of actions (e.g., the multiple series of actions being associated with each edge of traversal path 322). Thus, traversal path 322 may represent a component failure sequence, where each component within the sequence is unique. Multiple traversal paths (e.g., a set of traversal paths) may be defined for an acyclic graph to create a set of traversal paths. For example, all possible traversal paths may be enumerated. The set of traversal paths may include every unique path combination between a starting position and an end position.

Once a traversal path is established, aggregate relationships may be obtained. The aggregate relationships may be obtained by combining the relationships of each edge of the traversal path. For example, a cumulative MTTF and/or total cost value may be obtained by summing each of the MTTF and/or cost values for each edge of traversal path 322. Thus, to control and/or optimize the traversal path, the user may perform a specific action set (e.g., multiple generalized series of actions). To optimize the traversal path, the acyclic failure graph may be analyzed (e.g., recursively). Based on the analysis, a best-fit traversal path may be determined, for example, that optimizes one or more operational goals.

It should be appreciated that the example shown in FIG. 3B is simplified for the sake of clarity and that a more complex acyclic graph with a larger number of nodes and/or edges (e.g., traversal paths) may be encountered in practice.

Figure 3C:
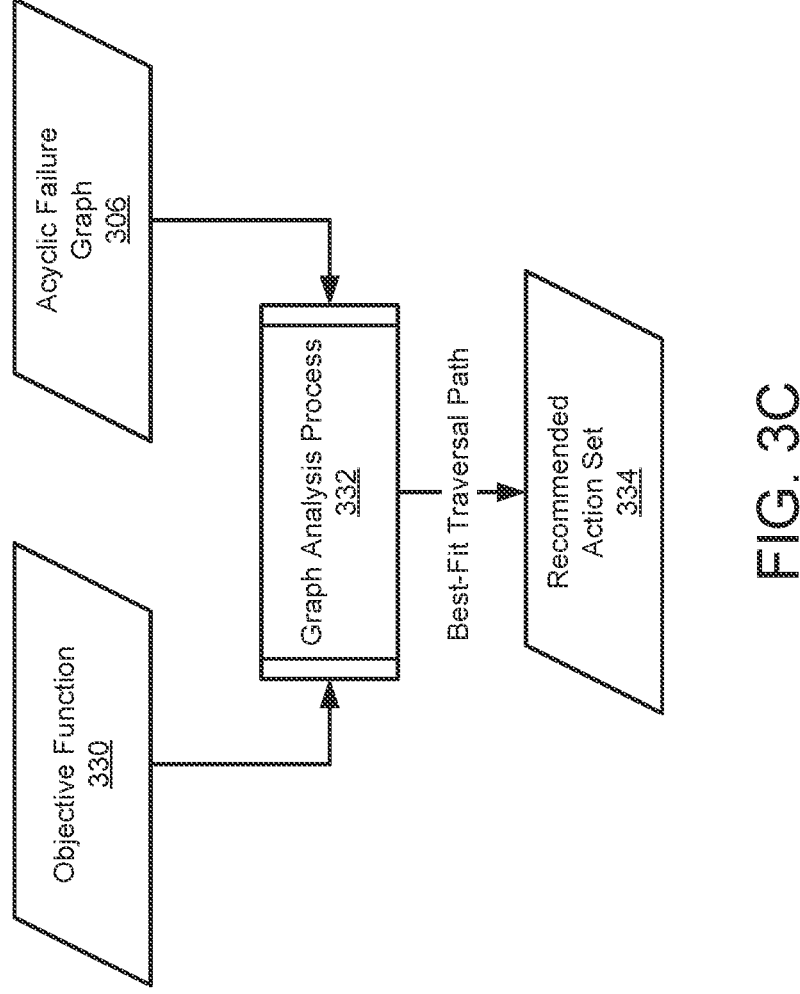
FIG. 3C shows a data flow diagram illustrating a process of analyzing an acyclic failure graph in accordance with an embodiment.

Turning to FIG. 3C, a fifth data flow diagram in accordance with an embodiment is shown. The data flow diagram illustrates a process of analyzing an acyclic failure graph. To analyze acyclic failure graph 306, acyclic failure graph 306 and objective function 330 may be input to graph analysis process 332. Acyclic failure graph 306 may be obtained from graph generation process 304, as described with respect to FIG. 3A.

Objective function 330 may be a mathematical representation of one or more operational goals. The operational goals may include (i) maximizing the MTTF (e.g., lifetime) for a particular component of the data processing system, (ii) maximizing the MTTF (e.g., lifetime) for the entire data processing system, (iii) minimizing the cost of maintenance for a particular component (and/or the entire data processing system), and/or other types of goals. Objective function 330 may be used during graph analysis process 332 to determine a traversal path that optimizes the operational goal (e.g., a best-fit traversal path), and/or rank various traversal paths with respect to one or more operational goals.

To do so, graph analysis process 332 may include identifying and/or enumerating all possible traversal paths of acyclic failure graph 306. The traversal paths may be analyzed independently to determine a fitness value of each traversal path with respect to an operational goal. For example, the fitness value of a traversal path may describe how well one or more aggregate relationships of the traversal path fit the operational goal.

The fitness value of a traversal path may be used to rank each traversal path (e.g., in ascending order of fitness value) to determine the best-fit traversal path. For example, a traversal path with a higher fitness value (e.g., higher rank) may best fit the operational goal (e.g., objective function). Thus, the traversal path with the largest rank may be identified as the best-fit traversal path.

Once the best-fit traversal path has been identified, graph analysis process 332 may use information regarding the best-fit traversal path from acyclic failure graph 306 to obtain recommended action set 334. The information may include a relationship of an edge and/or an aggregate relationship of one or more edges of the best-fit traversal path. For example, a series of actions associated with an edge of the best-fit traversal path may be recommended to be performed (e.g., via a system notification to a user). The series of actions described in recommended action set 334 may allow the user to prevent a catastrophic component failure and/or modify a failure sequence of components of a data processing system.

Graph analysis process 332 may be performed in real-time (e.g., based on changes in the current operating status of the data processing system) and thus, recommended action set 334 may be dynamic and/or may be provided to a user in real-time to increase the likelihood of meeting operational goals.

In practice, the analysis of large and/or complex acyclic failure graphs may be performed using one or more trained inference models. The models may be trained to recursively evaluate traversal paths of an acyclic graph in view of an operational goal. Based on new ingest data (e.g., real-time monitoring of system components), the inference model may generate an inference describing a recommended action set for the user to perform.

Thus, as illustrated in FIGS. 3A-3C, the system of FIG. 1 may obtain and/or generate an acyclic failure graph describing possible failure sequences of components of a data processing system based on consolidated failure information. The system of FIG. 1 may also analyze the acyclic failure graph in order to provide an action set. The action set may be initiated (e.g., by a user) to increase the likelihood of meeting an operational goal, improving the efficiency of managing and/or maintaining the data processing system.

FIG. 4 shows a flow diagram illustrating a method of managing operation of a data processing system in accordance with an embodiment. The method may be performed by the system of FIG. 1. Any of the operations described with respect to FIG. 4 may be performed in different orders, skipped, repeated, and/or be performed in a parallel or partially overlapping in time manner.

At operation 402, historical failure information may be obtained for data processing systems. The historical failure information may be obtained by (i) receiving the failure information from one or more data processing systems and/or devices, (ii) reading the failure information from storage, and/or (iii) generating the failure information. Failure information may be generated by ingesting historical log data (e.g., log segments) from one or more retired data processing systems (e.g., of production environments) into a trained inference model. The trained inference model may be similar to trained inference model C 242 (as described with respect to FIG. 2C) and may generate historical failure information in the form of a prediction. The prediction may include failure information regarding one or more predicted failures, predicted based on a pattern of actions (e.g., a series of actions) in the ingested log data. The failure information may include the failure type (e.g., a component type and/or a component ID of one or more retired data processing systems), the time-to-failure of the component ID, and/or the series of actions recorded in the log segment that may have led up to the component failure.

When presented with historical log data, the inference model may predict a particular order of future failures (e.g., a failure sequence of unique component IDs), and the associated failure information for each component failure in the sequence. The predictions generated by the inference model (e.g., failure information) may be consolidated and/or represented by an acyclic graph.

At operation 404, an acyclic graph is obtained based on the historical failure information. The acyclic graph may be obtained by (i) receiving the acyclic graph from one or more data processing systems and/or devices, (ii) reading the acyclic graph from storage, and/or (iii) generating the acyclic graph. The acyclic graph may be generated using a graph generation process. The graph generation process may include preparing (e.g., consolidating and/or aggregating) historical failure information obtained in operation 402, and component information (e.g., manufacturer dates and/or replacement costs) from various data sources. The consolidated failure information may be probabilistically (and/or statistically) determined (e.g., using processes similar to those described with respect to FIG. 3A).

The consolidated failure information may be used to establish a series of nodes connected by edges. The nodes may represent component failures and the edges may represent relationships between component failures. The series of nodes may be connected in a specific order, indicating an order of subsequent component failures (e.g., a failure sequence).

For example, to construct the acyclic graph, a second node in the sequence may represent a second component failure that occurs after a first node (e.g., a first component failure) in the sequence. The first and second node may be connected by an edge that represents a relationship between the first and second components (e.g., a MTTF, a generalized series of actions, and/or an average cost value). That is, the edges may indicate a duration of time between component failures, a cost value associated with repairing the second component, and/or a series of actions that may lead up to failure of the second component.

Continuing with the construction of the acyclic graph, the second node may be connected to a third node, representing a third component failure that occurred after the second component failure. The second and third node may be connected by a second edge, the second edge representing a relationship between the second and third components. The first, second, and third components may be unique and may define a failure sequence that may terminate at an end position. The end position may correspond to full data processing system failure.

The construction of the acyclic graph may continue based on the content of the consolidated failure information. Once constructed, traversal paths may be defined through the acyclic graph by connecting consecutive nodes within a failure sequence from a starting position to an end position. Multiple traversal paths may be defined (e.g., all possible traversal paths through the acyclic graph). The traversal paths may be used to determine how to optimize operational goals.

At operation 406, an operational goal for a manageable data processing system is identified. The operational goal may be identified by (i) receiving the operational goal from one or more data processing systems, (ii) reading the operational goal from storage, and/or (iii) receiving the operational goal from another device. The manageable data processing system may be a member of an active production environment. The operational goal may be determined by a user of the manageable data processing system. Any quantity of operational goals may be identified.

For example, the operational goal may include (i) cost minimization (e.g., to maintain and/or replace a component of the manageable data processing system and/or portion of the component), (ii) lifetime maximization (e.g., of a specific component of the data processing system and/or of the data processing system itself), and/or (iii) any other operational goal that may improve the performance of and/or mitigate component failure of the manageable data processing system. The operational goal may be represented mathematically (e.g., as an objective function), and may be used to analyze an acyclic graph.

At operation 408, the acyclic graph may be analyzed, based on the operational goal. The acyclic graph may be analyzed by performing a graph analysis process, similar to the process described with respect to FIG. 3C. For example, the graph analysis process may include enumerating each traversal path (e.g., of all possible traversal paths) through the acyclic graph.

A fitness value may be assigned to each of the enumerated traversal paths, based on one or more aggregate relationships for each of the traversal paths, and/or the objective function (e.g., which may take into account any number of aggregate relationships). The fitness values for the traversal paths may indicate which traversal path is likely to meet the operational goal, and/or an ordering of the traversal paths with respect to the likelihood of each traversal paths meeting the goals. Thus, the traversal paths may be ranked based on the fitness value. For example, the traversal paths may be ordered in descending order of fitness values and ranked (e.g., using consecutive positive integers). If a higher fitness value indicates a closer fit to the objective function, the lowest ranked traversal path may be selected as a best-fit traversal path.

Relationships associated with the best-fit traversal path may be used to obtain an action set. For example, each of the generalized series of actions associated with each edge of the best-fit traversal path may be concatenated to produce an action set for the manageable data processing system. The action set may be determined based on the current operating status of the manageable data processing system (e.g., based on the operating status of each component of the manageable data processing system). The action set may include timestamps (e.g., indicating when to perform one or more of the series of actions), and/or other instructions regarding implementing the action set.

At operation 410, performance of the action set by the manageable data processing system is initiated. The performance of the action set may be initiated by a user. The user may receive a notification regarding one or more actions to mitigate and/or prevent a component failure. The action set may include (i) initiating software to perform maintenance (e.g., disk defragmentation, software updates, etc.), (ii) performing a reconfiguration of a data processing system based on the component(s) predicted to fail, (iii) transferring workloads from the data processing system to other data processing systems, (iv) disabling a function of a data processing system, (v) disabling a hardware and/or software component of the data processing system, (vi) replacing and/or repairing one or more components of the data processing system, and/or (vii) performing other actions that may increase the likelihood of meeting the operational goal.

The method may end following operation 410.

While described above in operations 404-410 with active steps of analysis, it will be appreciated that inference models based on the acyclic graph and/or objective functions may be generated and used to obtain action sets. For example, one or more predictive inference models (e.g., machine-learning models) may be trained to ingest current operating conditions of a data processing system, and output a corresponding action set. Thus, the inference models may generalize the information included in the acyclic graph thereby allowing for conditions that do not perfectly map to previously encountered conditions to be analyzed to determine which actions to include in an action set.

Once recommended actions are implemented, the operation of the data processing systems may diverge from that expected based on the inference models and/or acyclic graph.

Turning to FIG. 5, a data flow diagram in accordance with an embodiment is shown. The data flow diagram illustrates a process of obtaining a new recommended action set for managing a data processing system. The data flow diagram in FIG. 5 may be used to evaluate a best-fit traversal path (e.g., the best-fit traversal path discussed above in connection with FIG. 3B) in real-time. More specifically, as discussed above in connection with FIG. 3B, the graph analysis process 332 may be performed in real-time (e.g., based on changes in the current operating status of the data processing system) and thus, recommended action set 334 may be dynamic and/or may be provided to a user (or the manageable data processing system) in real-time to increase the likelihood of meeting operational goals.

As shown in FIG. 5, actual data 502 and expected data 504 may be retrieved. The actual data 502 may be the actual results obtained from execution of one or more actions included in a recommended action set (e.g., the recommended action set 334 discussed above in connection with FIG. 3B). The expected data 504 may be the expected results associated with the execution of one or more actions included in the recommended data set. For example, the expected data 504 may include a recommended action set of "A'1, H'1, A'2, H'2, A'3, H'3" where A' (A prime) can be any number of actions and H' (H prime) can represent any number of health alerts as a result of execution of A' (e.g., execution of A'1 results in H'1). The actual data 502 may be dynamically updated based on actual execution of any of the A primes shown in the expected data 504. For example, at one instance in time A'1 is being executed and produces a result of H'X (where X can be any number based on one or more results measured/detected/identified by the data processing system as A'1 is being executed). In this example where only A'1 is executed, the actual data 502 would include "A'1, H'X". In another example, assume that A'1 is executed and H'1 is recorded by the data processing system as the result for execution of A'1 and then A'2 is executed and H'X is recorded as the result of for execution of A'2. In this example, the actual data would include "A'1, H'1, A'2, H'X".

Deviation detection process 506 may obtain the actual data 502 and the expected data 504 and detect (e.g., determine) whether there are any deviations (e.g., differences) between the actual data 502 and the expected data 504. Deviation detection process 506 may be conducted at any time (e.g., at a time interval set by a user, at detection of fulfilment of a condition set by a user, or the like). For example, a user may set the deviation detection process 506 to be executed after execution of a single action (or a set of actions) included in a recommended action set such that an actual result (or actual results) from execution of the single action (or the set of actions) may be comparted to the expected result (or expected results) of the same action (or set of actions). Using above-discussed action set "A'1, H'1, A'2, H'2, A'3, H'3" as reference, the deviation detection process 506 may be executed each time an A' within the action set is being executed.

As a further example of the deviation detection process 506, assume that the actual data 502 is "A'1, H'1, A'2, H'2, A'3, H'3" and the expected data 504 is "A'1, H'1, A'2, H'2, A'3, H'3". In this example, the deviation detection process

506 will determine that the two sets of data are identical and that there are no deviations between the actual data 502 and expected data 504. Now assume that the actual data 502 is "A'1, H'1, A'2, H'2, A'3, H'3" and the expected data 504 is "A'1, H'1, A'2, H'4". In this example, the deviation detection process will determine that there is a deviation in the actual data 502 from the expected data 504 because A'2 in the actual data 502 resulted in H'4 instead of H'2, as was expected in the expected data 504. Said another way, each of the actual data 502 and the expected data 504 may include a sequence of actions and results. The deviation detection process 506 will detect a deviation between the two sets if there is a mismatch (e.g., difference) between the two sequences of actions and results.

Deviation evaluation process 508 may obtain the detected deviation (if any) detected by the deviation detection process 506. Deviation evaluation process 508 may then evaluate the deviation by calculating a similarity (e.g., a similarity value) between the actual data 502 and the expected data 504. For example, the similarity between the actual data 502 and the expected data 504 (e.g., the similarity of the sequences included in the two sets of data) may be calculated using Edit Distance (e.g., Levenshtein Distance) or a Cosine Similarity of a sequence embedding vector (e.g., consider each log line as a term in a natural language processing (NLP) problem, encode the sequence of log lines as an embedding vector, and calculate a distance between the two vectors using Cosine calculation). As another example, the similarity between the actual data 502 and the expected data 504 may calculated using a weights on sequence function where the most recent item in a sequence is given more weight than an item at the start of the sequence (e.g., each sequence in the actual data 502 and the expected data 504 is transformed into a weight function). The weight function may range from a start to an end of a sequence and may be configured based on one or more domain knowledge. An example of the weight function may be, but is not limited to, a Sigmoid function.

Using the similarity value, the deviation evaluation process 508 may calculate a match score for the actual data 502 (e.g., the sequence in the actual data) and for the expected data 504 (e.g., the sequence in the actual data). The match score may be calculated as:

$$\text{Match Score} = \text{Original Match Score} \times \text{Similarity Value} \quad \text{(Equation 1)}$$

In above equation 1, the "Original Match Score" may be an attribution score assigned by the data processing system to the expected data 504. For example, referring back to FIG. 3B, assume that the manageable data processing system (or the user) is currently traversing through the acyclic failure graph 306 in real-time and is currently at node 318. Further assume that, based on the inferences generated by the data processing system (e.g., using the processes discussed in FIGS. 2A-4), the recommended action set 334 (e.g., the above example sequence of "A'1, H'1, A'2, H'2, A'3, H'3" in expected data 504) to get from node 318 to node 324 on the traversal path 322 is assigned an attribution score of 70%. In this example, the "Original Match Score" would be 70%.

Using the same example above where the "Original Match Score" of the expected data 504 (e.g., expected data 504 having sequence "A'1, H'1, A'2, H'2, A'3, H'3") is 70%, now assume that the actual data 502 has the sequence of "A'1, H'1, A'2, H'2, A'3, H'4". A match score is calculated (e.g., using deviation evaluation process) for each of the expected data 504 and the actual data 502. Since the expected data 504 is identical to itself, the similarity value of the actual data 502 would be 1, resulting in a match score of 70% (e.g., 70%×1). Assume now that the similarity value between the expected data 504 (e.g., "A'1, H'1, A'2, H'2") and the actual data 502 (e.g., "A'1, H'1, A'2, H'4") is 0.8. This would result in the match score of the actual data 502 to be 56% (e.g., 70%×8).

Once the match scores for both the actual data 502 and the expected data 504 are obtained, deviation evaluation process 508 may determine whether the match score of the actual data 502 is smaller than (e.g., less than) a predefined match score threshold. The result of this determination may be used an evaluation result that is generated by the deviation evaluation process.

New action set generation process 510 may obtain the evaluation result generated by the deviation evaluation process 508 and determine whether to generate a new recommend action set 512. For example, if the evaluation result indicates that the match score of the actual data 502 is smaller than (e.g., less than) the predefined match score threshold, the new action set generation process 510 will determine that the original action recommendation (e.g., the original recommended action set 334 is no longer proper (e.g., no longer proper for achieving the original operational goals)), and cause generation of the new recommended action set 512. Alternatively, if the evaluation result indicates that the match score of the actual data 502 is not smaller than (e.g., greater than or equal to) the predefined match score threshold, the new action set generation process 510 will determine that the original action (e.g., the original recommended action set is still proper) and cause notification to a user (e.g., via displaying a message on a display) and/or the manageable data processing system that the original next action of A'3 in the expected data 504 of "A'1, H'1, A'2, H'2, A'3, H'3" should still be used as the next action (or set of actions).

In generating the new recommendation action set, the new action set generation process 510 may repeat the match score calculation process conducted by the deviation evaluation process using an action (or a set of actions) taken locally or globally from the acyclic failure graph 306. Taking an action locally may mean that the action (or set of actions) is taken from an edge (e.g., one of the edges on acyclic failure graph 306) that is covered by (e.g., part of) the traversal path 322 (e.g., the previously determined best-fit traversal path). Taking an action globally may mean that the action (or set of action) is taken from an edge (e.g., one of the edges on acyclic failure graph 306) that is not covered by (e.g., part of) the traversal path 322 (e.g., any of the un-numbered edges coming out from the right or bottom side of node 318 in FIG. 3). When selecting an edge to take an action locally or globally, the edges in consideration may only include the edges coming after a node at which the user (or the manageable data processing system) is currently on. More specifically, continuing the above example where the user (or the manageable data processing system) is assumed to be on node 318 of the acyclic failure graph 306 of FIG. 3B, edges 310, 312, and 314 (including the edges following after edges 310 and edges 314) would not be considered within the locally or globally edge selection.

Continuing with the above example where the actual data 502 is "A'1, H'1, A'2, H'4" and the expected data 504 is "A'1, H'1, A'2, H'2" and assuming: (1) that the match score of the actual data 502 is smaller than (e.g., less than) the predefined match score threshold (e.g., a new recommended action set should be generated by the new action set generation process 510); (2) taking locally includes (in part) two options of action A'5 with an attribution score of 60% and action of A'6 with an attribution score of 65% (e.g., assuming as the top two highest attribution scores found locally); and (3) taking globally includes (in part) two options of action A'8 with an attribution score 90% and action A'9 with an attribution score of 50% (e.g., assuming as the top two highest attribution scores found globally). Further assume that the new action set generation process 510 may be configured to prioritize local takes over global takes (e.g., if none of the global take options result in a higher attribution score than any of the local take options). In this example, the global take option of action A'8 having an attribution score of 90% (e.g., the highest match) score would be chosen by the new action set generation process 510. As a result, the new recommended action set 512 generated by the new action set generation process may include instructions for the user (or the manageable data processing system) to perform action A'8 as the next action (or set of actions) to result in an updated actual sequence of "A'1, H'2, A'2, H'4, A'8, . . . ".

Turning back to the local and global taking of actions, the attribution score associated with a taken action (e.g., the above-discussed taken actions of A'5, A'6, A'8, A'9) may be a static attribution score or a dynamic attribution score. A static attribution score is associated with a taken action that does not follow the most-recent result in the actual data 502 (e.g., here H'4 in "A'1, H'1, A'2, H'4"). For example, assume that there is an action set at node 318 with an attribution score of 60% that results in the expected sequence of "A'1, H'1, A'4, H'5, A'5, H'7". Next assume that the locally taken action A'5 is taken from this sequence. Because A'5 comes after H'5 and not H'4 (e.g., the actual most current result in the sequence of the actual data 502), the attribution score of this sequence would be indicated (e.g., considered/labeled as a static attribution score. On the other hand, a dynamic attribution score is associated with a taken action that does follow the most-recent result in the actual data 502 (e.g., here H'4). For example, assume that there is an action set at node 318 with an attribution score of 65% that results in the expected sequence of "A'5, H'5, A'2, H'4, A'6, H'9". Next, assume that the locally taken action of A'6 is taken from this sequence. Because A'6 comes after H'4 (e.g., the actual most current result in the sequence of the actual data 502), the attribution score of this sequence would be indicated (e.g., considered/labeled) as a dynamic attribution score.

Turning now to FIG. 6, FIG. 6 shows a flow diagram illustrating a method of managing operation of a data processing system in accordance with an embodiment. The method may be performed by the system of FIG. 1. Any of the operations described with respect to FIG. 6 may be performed in different orders, skipped, repeated, and/or be performed in a parallel or partially overlapping in time manner.

At operation 602, expected data and actual data generated while executing one or more recommended action sets may be obtained. The obtained expected data and actual data may be identical to expected data 504 and actual data 502, respectively, discussed above in connection with FIG. 5. The expected data and the actual data may be obtained in real-time based on changes in the current operating status of the data processing system as a result of execution of an action (or a set of action) (e.g., by a user of the data processing system or by a manageable data processing system) from a recommended action set (e.g., recommended action set 334 generated using one or more processes discussed above in FIGS. 2A-4).

At operation 604, a determination is made as to whether there is a deviation between the expected data and the actual data (e.g., the expected and actual data obtained in operation 602). The deviation may be detected using the above-discussed processes executed by deviation detection process 506 of FIG. 5.

In the event a deviation is not detected (i.e., NO in operation 604), the process proceeds to operation 612 where a determination is made as to whether an end of the traversal path (e.g., a traversal path such as the best-fit traversal path on the acyclic failure graph 306 shown in FIG. 3) has been reached. If the end of the traversal path has been reached (i.e., YES in operation 612) the process may end. Otherwise (i.e., NO in operation 612 that the end of the traversal path has not been reached), the process continues (e.g., in real-time) to intake (e.g., obtain) and compare actual data to the expected data (e.g., the process returns to and continues with the operation 602)

Alternatively, in operation 604, in the event a deviation is detected between the actual data and the expected data (i.e., YES in operation 604), the process proceeds to operation 608 where a determination is made as to whether the detected deviation is within a predetermined threshold (e.g., as discussed above in FIG. 5 in connection with the processes executed by the deviation evaluation process 508 and the new action set generation process 510 where a match score is calculated for the actual data and the match score is compared to a predetermined match score threshold).

In the event that the deviation is determined to not be less than (e.g., determined to be greater than or equal to) the predetermined threshold (e.g., the predetermined match score threshold discussed in connection to FIG. 5) (i.e., NO in operation 608), the process moves to above-discussed operation 612 where the process may end or continue based on the determination made in operation 612. The process may also (in operation 608 as part of a NO determination) generate a notification to a user and/or the manageable data processing system) executing the actions in the recommended action set indicating to the user and/or the manageable data processing system that a deviation was detected (while also showing the deviation) but that the user and/or the manageable data processing system should still continue with the next action specified in the recommended action set because the deviation's affect to the user's operational goals for the data processing system is minimal (e.g., de minimis, nominal, insignificant, etc.).

Alternatively, in operation 608, in the event that the deviation is determined to be less than the predetermined threshold (e.g., the predetermined match score threshold discussed in connection to FIG. 5) (i.e., YES in operation 608), the process proceeds to operation 610 where a new recommended action set is generated (e.g., using the same processes executed by new action set generation process 510 discussed in connection with FIG. 5). Additionally, in operation 610, a notification may be generated to show the new recommended action set to a user (e.g., via displaying on a display of the data processing system) and/or to the manageable data processing system. The notification may also include information showing the deviation detected in operation 604 and information specifying that the deviation has rendered the current recommended action set improper (e.g., undesirable) for meeting the user's operational goals for the data processing system.

After operation 610, the process may proceed to operation 612 where the process may end or continue based on the determination made in operation 612.

Thus, as illustrated above, embodiments disclosed herein may provide systems and methods usable to manage data processing systems. Trained inference models may be implemented to analyze log segments obtained from data processing systems, and to predict component failures and sequences thereof. The predicted failure sequences may be presented in the form of an acyclic graph and may be analyzed to determine a set of actions that the user may perform to manage future component failures according to operational goals.

Thus, embodiments disclosed herein may provide an improved computing device that is able to extract useful information from log data, usable for management purposes. Further, the disclosed process may facilitate identification of relationships that a person may easily overlook. Accordingly, the disclosed process provides for both an embodiment in computing technology and an improved method for device management. Rather than relying on a person's intuition or expert knowledge, an automated process for analysis may be provided.

Figure 7:
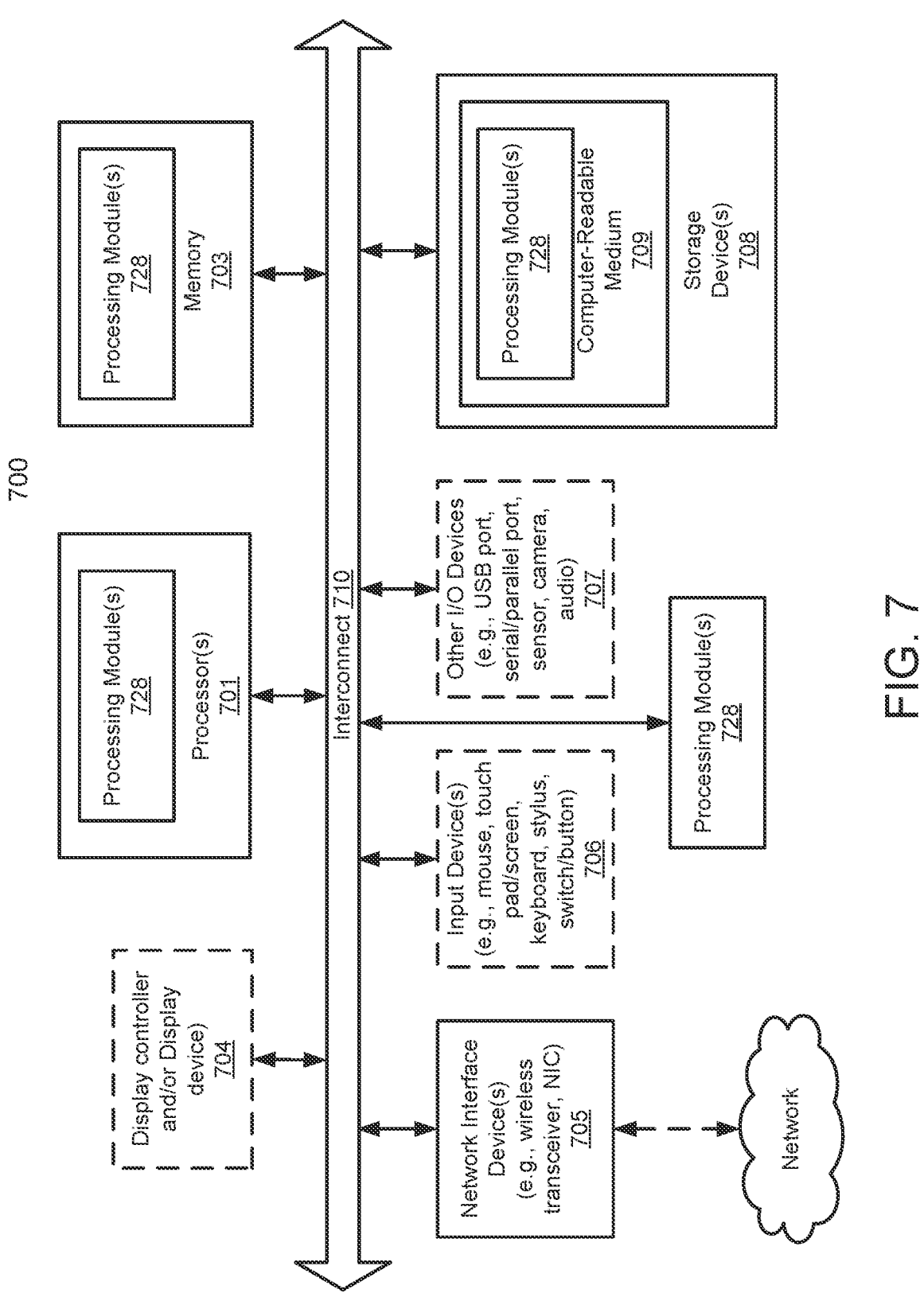
FIG. 7 shows a block diagram illustrating a data processing system in accordance with an embodiment.

Any of the components illustrated in FIGS. 1-3C and 6 may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high-level view of many components of the computer system. However, it is to be understood that additional components may be present in certain implementations and furthermore, different arrangement of the components shown may occur in other implementations.

System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 501 may represent one or more general-purpose processors such as a microprocessor, a central processing unit (CPU), or the like.

More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with an optional graphics subsystem, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device.

For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 528 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/ logic 728 can be implemented in any combination hardware devices and software components.

Note that while system 700 is illustrated with various components of a data processing system, it is not intended to represent any particular architecture or manner of inter- connecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic repre- sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir- ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com- puting device, that manipulates and transforms data repre- sented as physical (electronic) quantities within the com- puter system's registers and memories into other data similarly represented as physical quantities within the com- puter system memories or registers or other such informa- tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the opera- tions described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data processing systems, comprising:

obtaining, by a data processing system manager of the data processing systems, actual data in real-time while a manageable data processing system is simultaneously being caused by the data processing system manager to execute a failure-related action associated with an acyclic graph obtained by the data processing system manager to remediate a current failure or to prevent a potential future failure of the manageable data process- ing system, wherein the manageable data processing system is one of the data processing systems and the actual data is associated with operations performed and data generated by the manageable data processing system as the manageable data processing system executes the failure-related action, and the acyclic graph comprises a plurality of nodes connected by a plurality of edges where the plurality of edges represent relationships between the plurality of nodes and the relationships being probabilistically defined based on historical failure information for the data processing systems;

determining, by the data processing system manager, that a deviation exists between the actual data and expected data specified in the acyclic graph;

calculating, by the data processing system manager and based on determining that the deviation exists, a match score between the actual data and the expected data;

determining, by the data processing system manager and based on the match score, a course of action associated with a configuring of the manageable data processing system, wherein the course of action is associated with achieving an operational goal of the manageable data processing system and the deviation decreases a like- lihood of the manageable data processing system meet- ing the operational goal; and causing, by the data processing system manager and through sending instructions to the manageable data processing system via a communication system that operably connects the data processing system manager to the manageable data processing system, the man- ageable data processing system to execute the course of action, wherein executing the course of action prevents the decreases in the likelihood of the manageable data processing system meeting the operation goal, and wherein the method further comprises, and by the data processing system manager before obtaining the actual data:

obtaining the acyclic graph based on the historical failure information for the data processing systems;

identifying the operational goal for the manageable data processing system, the operational goal being associated with remediation of the current failure or prevention of the potential future failure of the manageable data processing system;

analyzing the acyclic graph based on the operational goal to obtain an action set by:

enumerating traversal paths through the acyclic graph;

for each traversal path of the enumerated traversal paths:

obtaining an aggregate relationship based on the relationships associated with all of the edges along the traversal path, obtaining a fitness value based on the aggregate relationship and the operational goal, and obtaining a rank for the traversal path based on the fitness value, the rank being usable to order the traversal paths;

selecting an initial best fit traversal path of the traversal paths based on the rank of each of the traversal paths;

obtaining the action set based on the initial best fit traversal path; and causing the manageable data processing system to execute the action set as the failure-related action.

2. The method of claim 1, wherein obtaining the acyclic graph comprises and by the data processing system manager:

establishing a second node based on a failure of a second component type, the failure of the second component type occurring after a failure of a first component type, and the failure of the first component type being represented by a first node;

establishing a first edge between the first node and the second node, the first edge being associated with a first relationship;

establishing a third node based on a failure of a third component type, the failure of the third component type occurring after the failure of the second component type; and establishing a second edge between the second node and the third node, the second edge being associated with a second relationship.

3. The method of claim 1, wherein determining the course of action comprises:

generating, based on the deviation and the traversal paths of the acyclic graph, a new action set including one or more new actions different from one or more original actions that make up the action set, the new action set being the course of action.

4. The method of claim 3, wherein the new action set is associated with a new best-fit traversal path among the traversal paths that is different from the initial best fit traversal path.

5. The method of claim 1, wherein the expected data is associated with one or more expected operations the manageable data processing system should perform and expected data the manageable data processing system should generate as the manageable data processing system executes the failure-related action, and the deviation causes the manageable data processing system to fail to remediate the current failure or prevent the potential future failure.

6. The method of claim 1, wherein the match score is based on:

a similarity value between the actual data and the expected data, and an attribution score assigned to the expected data.

7. The method of claim 1, wherein the acyclic graph is obtained from a storage of the data processing system manager.

8. A non-transitory machine-readable medium having instructions stored therein, which when executed by a processor of a data processing system manager that manages data processing systems, cause the data processing system manager to perform operations for managing the data processing systems, the operations comprising:

obtaining actual data in real-time while a manageable data processing system is simultaneously being caused by the data processing system manager to execute a failure-related action associated with an acyclic graph obtained by the data processing system manager to remediate a current failure or to prevent a potential future failure of the manageable data processing system, wherein the manageable data processing system is one of the data processing systems and the actual data is associated with operations performed and data generated by the manageable data processing system as the manageable data processing system executes the failure-related action, and the acyclic graph comprises a plurality of nodes connected by a plurality of edges where the plurality of edges represent relationships between the plurality of nodes and the relationships being probabilistically defined based on historical failure information for the data processing systems;

determining that a deviation exists between the actual data and expected data specified in the acyclic graph;

calculating, based on determining that the deviation exists, a match score between the actual data and the expected data;

determining, by the data processing system manager and based on the match score, a course of action associated with a configuring of the manageable data processing system, wherein the course of action is associated with achieving an operational goal of the manageable data processing system and the deviation decreases a likelihood of the manageable data processing system meeting the operational goal; and causing, by sending instructions to the manageable data processing system via a communication system that operably connects the data processing system manager to the manageable data processing system, the manageable data processing system to execute the course of action, wherein executing the course of action prevents the decreases in the likelihood of the manageable data processing system meeting the operation goal, and wherein the operations further comprise, before obtaining the actual data:

obtaining the acyclic graph based on the historical failure information for the data processing systems;

identifying the operational goal for the manageable data processing system, the operational goal being associated with remediation of the current failure or prevention of the potential future failure of the manageable data processing system;

analyzing the acyclic graph based on the operational goal to obtain an action set by:

enumerating traversal paths through the acyclic graph;

for each traversal path of the enumerated traversal paths:

obtaining an aggregate relationship based on the relationships associated with all of the edges along the traversal path, obtaining a fitness value based on the aggregate relationship and the operational goal, and obtaining a rank for the traversal path based on the fitness value, the rank being usable to order the traversal paths;

selecting an initial best fit traversal path of the traversal paths based on the rank of each of the traversal paths; and obtaining the action set based on the initial best fit traversal path; and causing the manageable data processing system to execute the action set as the failure-related action.

9. The non-transitory machine-readable medium of claim 8, wherein obtaining the acyclic graph comprises:

establishing a second node based on a failure of a second component type, the failure of the second component type occurring after a failure of a first component type, and the failure of the first component type being represented by a first node;

establishing a first edge between the first node and the second node, the first edge being associated with a first relationship;

establishing a third node based on a failure of a third component type, the failure of the third component type occurring after the failure of the second component type; and establishing a second edge between the second node and the third node, the second edge being associated with a second relationship.

10. The non-transitory machine-readable medium of claim 8, wherein determining the course of action comprises:

generating, based on the deviation and the traversal paths of the acyclic graph, a new action set including one or more new actions different from one or more original actions that make up the action set, the new action set being the course of action.

11. The non-transitory machine-readable medium of claim 10, wherein the new action set is associated with a new best-fit traversal path among the traversal paths that is different from the initial best fit traversal path.

12. The non-transitory machine-readable medium of claim 8, wherein the expected data is associated with one or more expected operations the manageable data processing system should perform and expected data the manageable data processing system should generate as the manageable data processing system executes the failure-related action, and the deviation causes the manageable data processing system to fail to remediate the current failure or prevent the potential future failure.

13. The non-transitory machine-readable medium of claim 8, wherein the match score is based on:

a similarity value between the actual data and the expected data, and an attribution score assigned to the expected data.

14. The non-transitory machine-readable medium of claim 8, wherein the acyclic graph is obtained from a storage of the data processing system manager.

15. A data processing system manager, comprising:

a processor; and a memory coupled to the processor to store instructions, which when executed by the processor, cause the processor to perform operations for managing data processing systems, the operations comprising:

obtaining actual data in real-time while a manageable data processing system is simultaneously being caused by the data processing system manager to execute a failure-related action associated with an acyclic graph obtained by the data processing system manager to remediate a current failure or to prevent a potential future failure of the manageable data processing system, wherein the manageable data processing system is one of the data processing systems and the actual data is associated with operations performed and data generated by the manageable data processing system as the manageable data processing system executes the failure-related action, and the acyclic graph comprises a plurality of nodes connected by a plurality of edges where the plurality of edges represent relationships between the plurality of nodes and the relationships being probabilistically defined based on historical failure information for the data processing systems;

determining that a deviation exists between the actual data and expected data specified in the acyclic graph;

calculating, based on determining that the deviation exists, a match score between the actual data and the expected data;

determining, based on the match score, a course of action associated with a configuring of the manageable data processing system, wherein the course of action is associated with achieving an operational goal of the manageable data processing system and the deviation decreases a likelihood of the manageable data processing system meeting the operational goal; and causing, by sending instructions to the manageable data processing system via a communication system that operably connects the data processing system manager to the manageable data processing system, the manageable data processing system to execute the course of action, wherein executing the course of action prevents the decreases in the likelihood of the manageable data processing system meeting the operation goal, and wherein the operations further comprise, before obtaining the actual data:

obtaining the acyclic graph based on the historical failure information for the data processing systems;

identifying the operational goal for the manageable data processing system, the operational goal being associated with remediation of the current failure or prevention of the potential future failure of the manageable data processing system;

analyzing the acyclic graph based on the operational goal to obtain an action set by:

enumerating traversal paths through the acyclic graph;

for each traversal path of the enumerated traversal paths:

obtaining an aggregate relationship based on the relationships associated with all of the edges along the traversal path, obtaining a fitness value based on the aggregate relationship and the operational goal, and obtaining a rank for the traversal path based on the fitness value, the rank being usable to order the traversal paths;

selecting an initial best fit traversal path of the traversal paths based on the rank of each of the traversal paths; and obtaining the action set based on the initial best fit traversal path; and causing the manageable data processing system to execute the action set as the failure-related action.

16. The data processing system manager of claim 15, wherein obtaining the acyclic graph comprises and by the data processing system manager:

establishing a second node based on a failure of a second component type, the failure of the second component type occurring after a failure of a first component type, and the failure of the first component type being represented by a first node;

establishing a first edge between the first node and the second node, the first edge being associated with a first relationship;

establishing a third node based on a failure of a third component type, the failure of the third component type occurring after the failure of the second component type; and establishing a second edge between the second node and the third node, the second edge being associated with a second relationship.

17. The data processing system manager of claim 15, wherein determining the course of action comprises:

generating, based on the deviation and the traversal paths of the acyclic graph, a new action set including one or more new actions different from one or more original actions that make up the action set, the new action set being the course of action.

18. The data processing system manager of claim 17, wherein the new action set is associated with a new best-fit traversal path among the traversal paths that is different from the initial best fit traversal path.

19. The data processing system manager of claim 15, wherein the expected data is associated with one or more expected operations the manageable data processing system should perform and expected data the manageable data processing system should generate as the manageable data processing system executes the failure-related action, and the deviation causes the manageable data processing system to fail to remediate the current failure or prevent the potential future failure.

20. The data processing system manager of claim 15, wherein the match score is based on:

a similarity value between the actual data and the expected data, and an attribution score assigned to the expected data.

\* \* \* \* \*